Oct. 10, 1961     E. A. THOMPSON     3,003,292
INTERNAL GRINDER

Filed Nov. 12, 1957                                                       20 Sheets-Sheet 1

INVENTOR.
EARL A. THOMPSON
BY
Ralph L. Tweedale
ATTORNEY

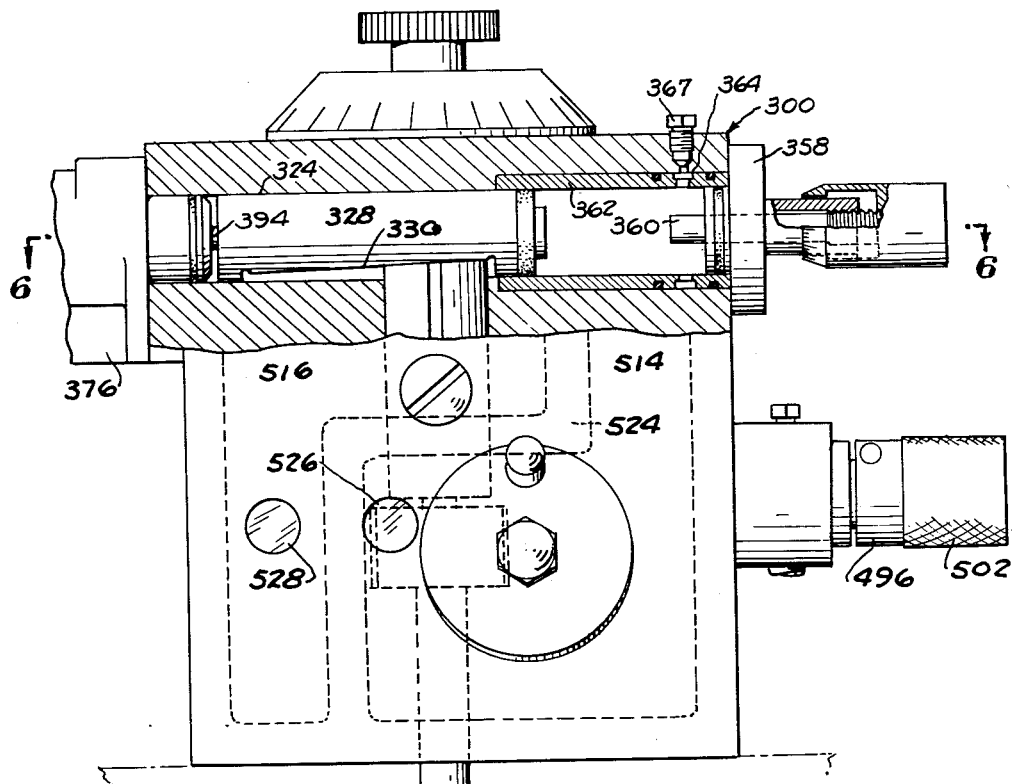
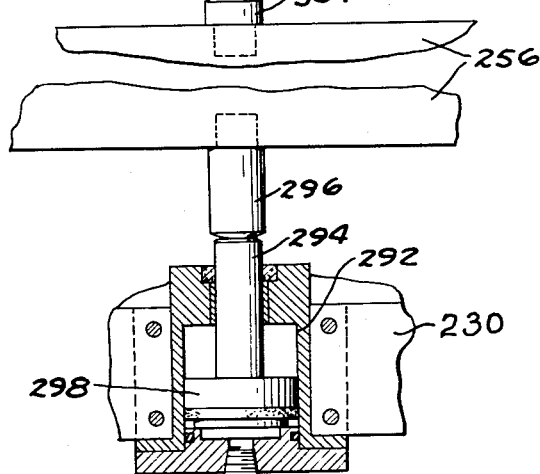
Fig. 5

INVENTOR.
EARL A. THOMPSON
ATTORNEY

INVENTOR.
EARL A. THOMPSON
BY
Ralph R. Truesdale
ATTORNEY

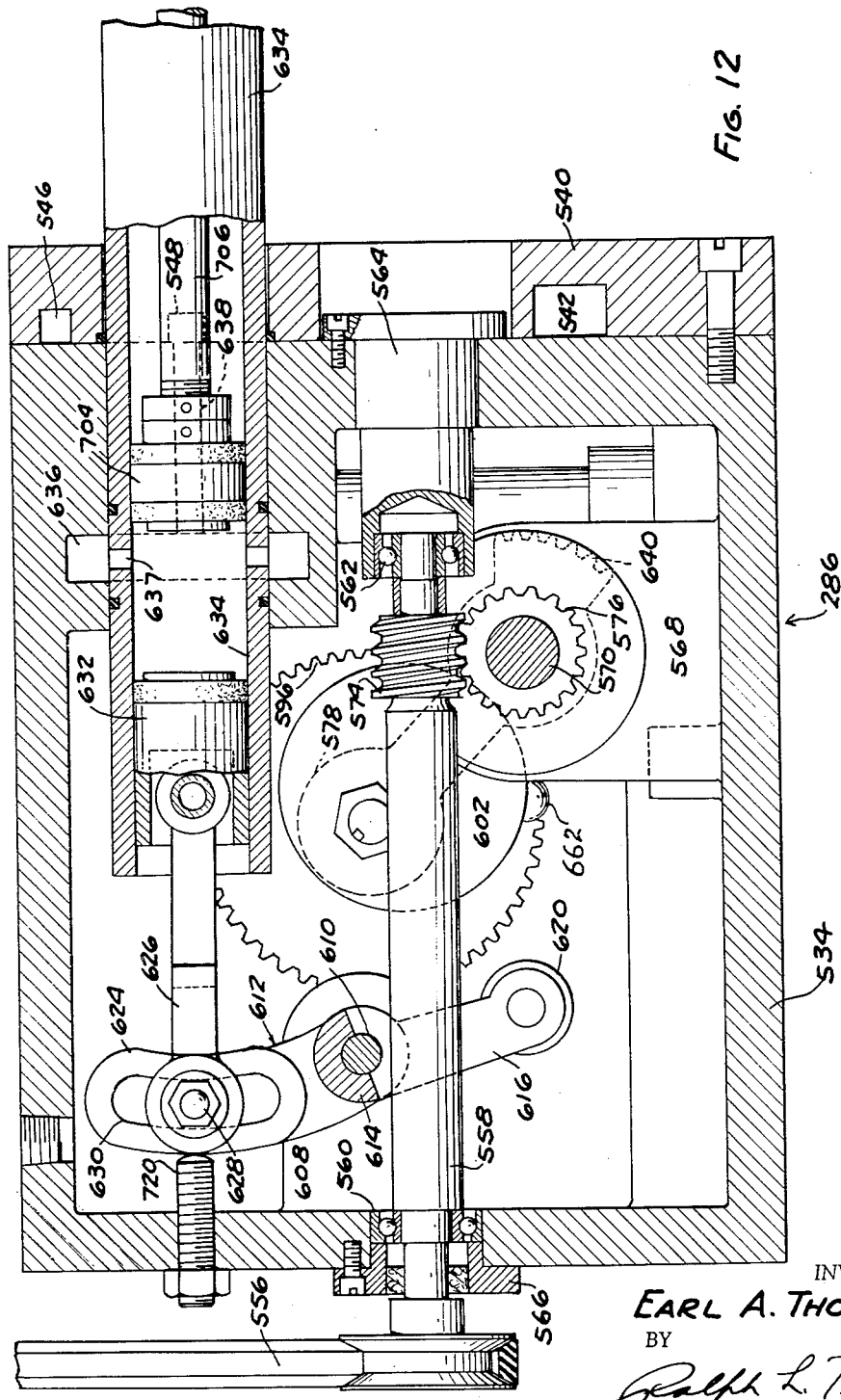

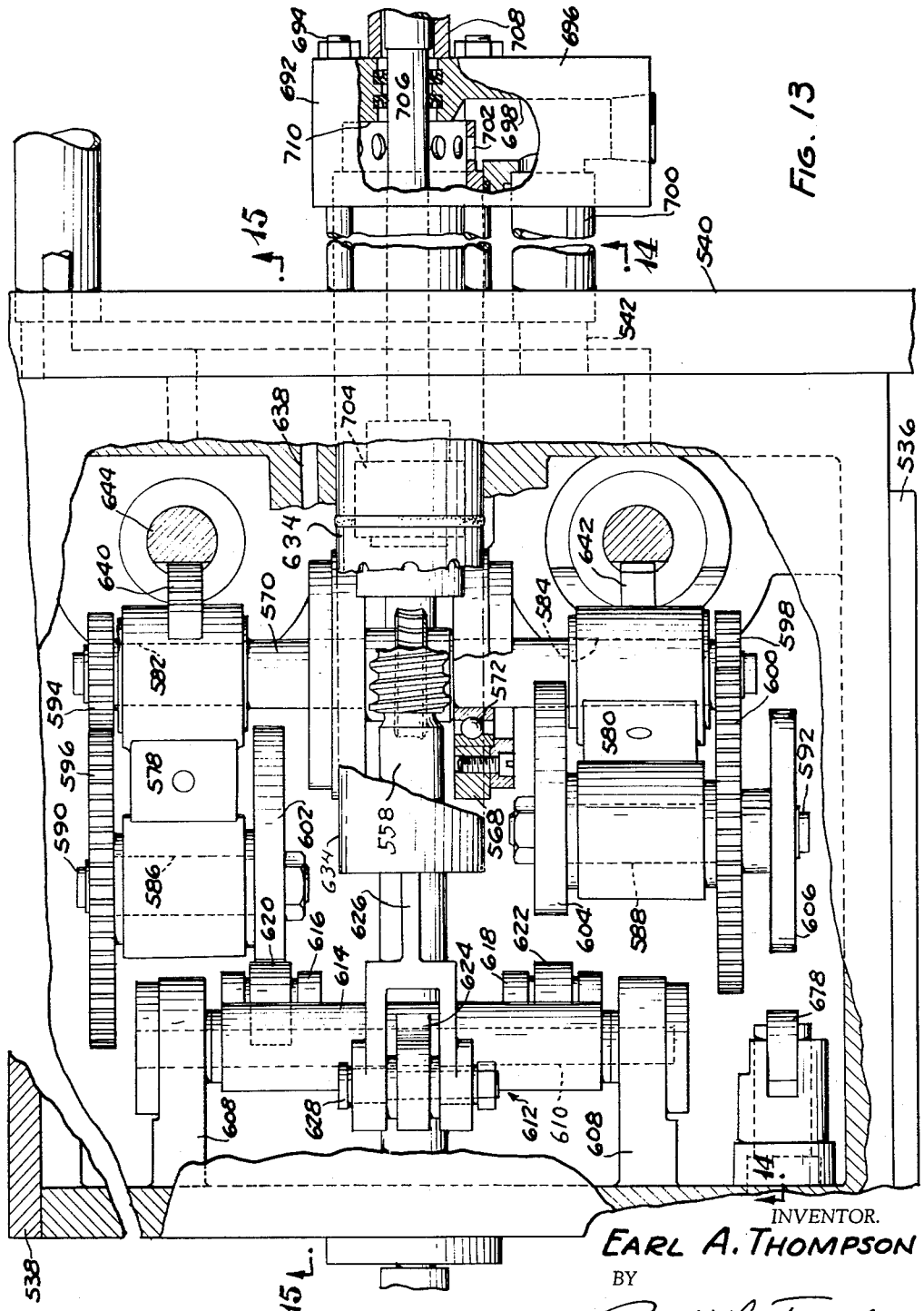

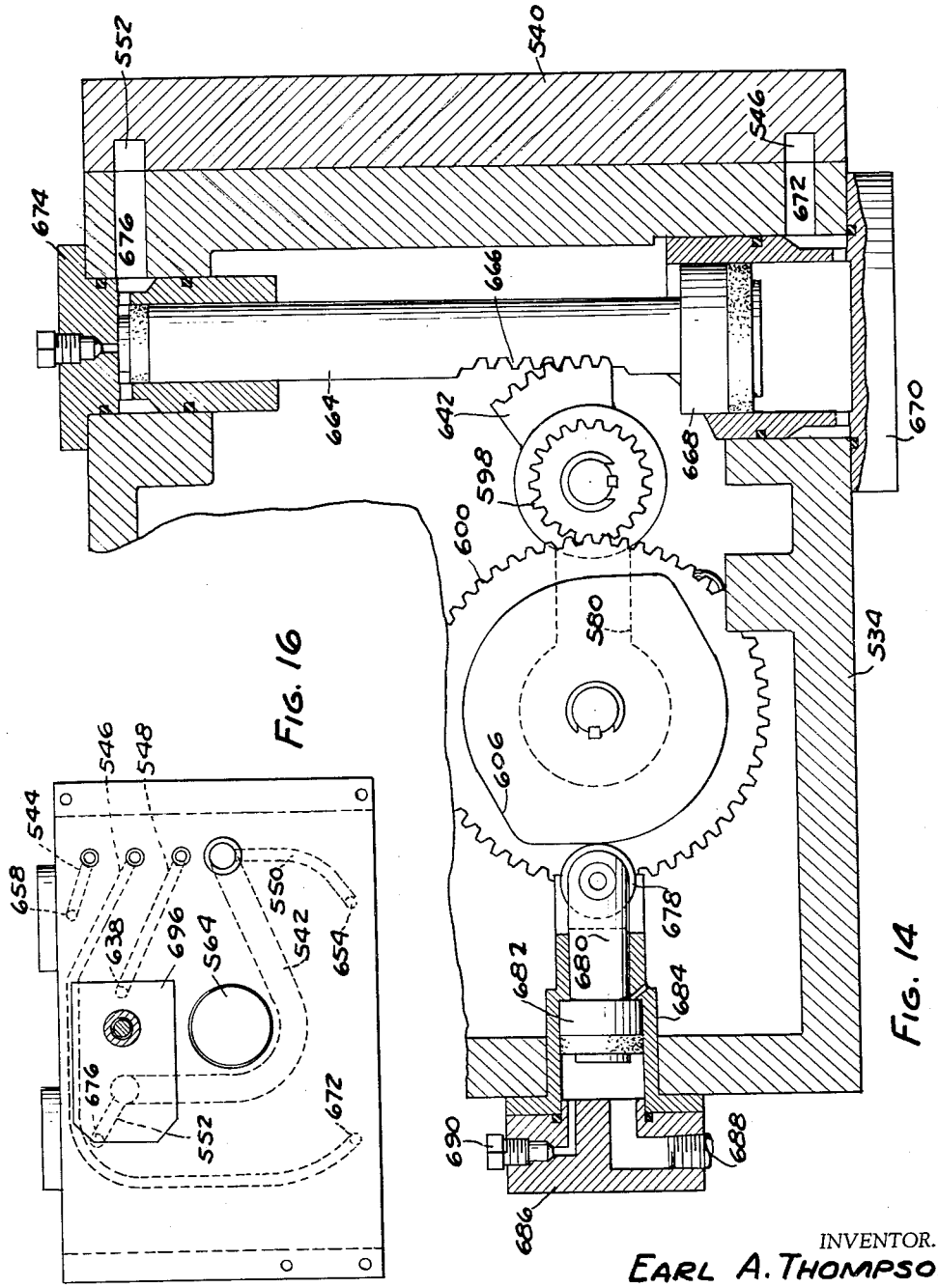

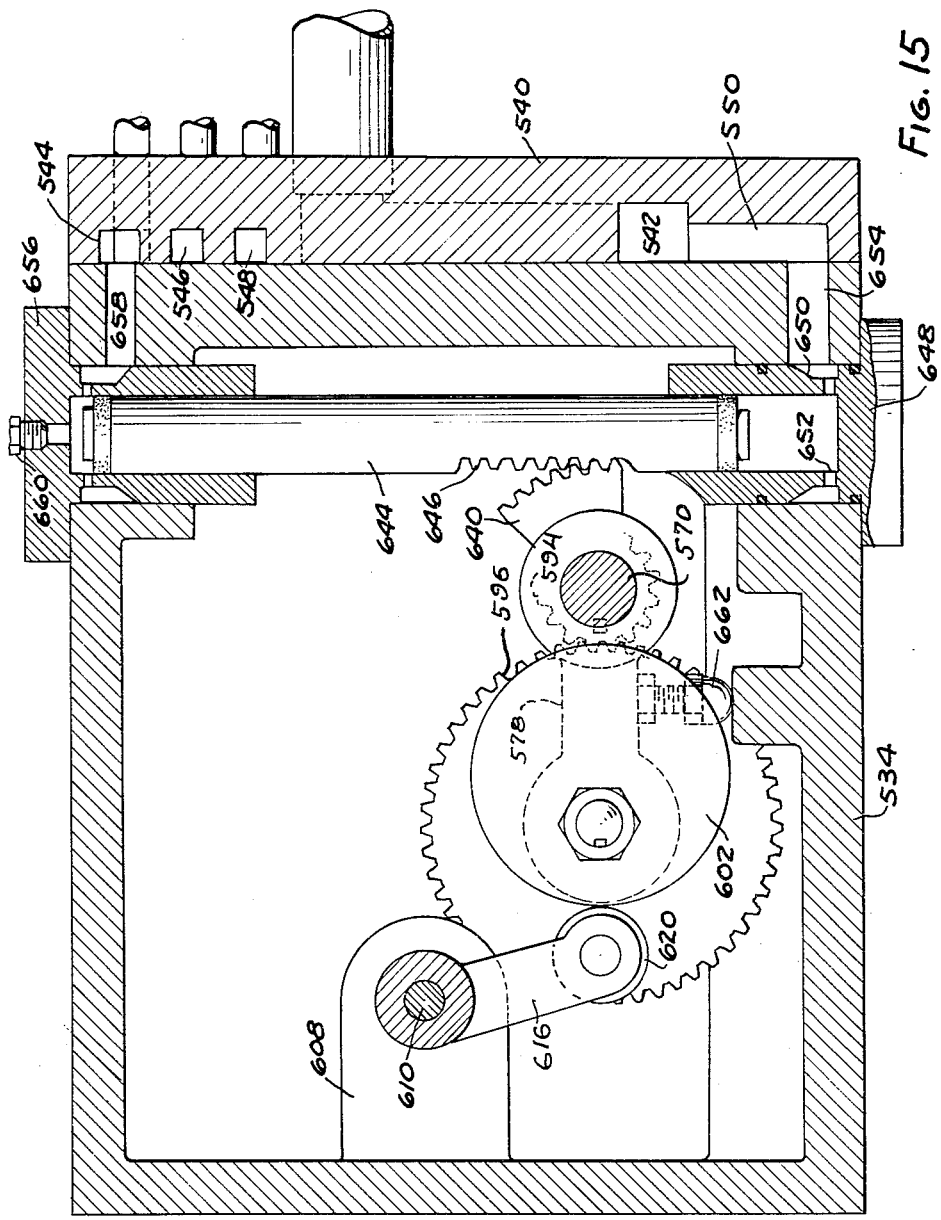

Oct. 10, 1961  E. A. THOMPSON  3,003,292
INTERNAL GRINDER
Filed Nov. 12, 1957  20 Sheets—Sheet 13

INVENTOR.
EARL A. THOMPSON
BY
Ralph L. Tweedale
ATTORNEY

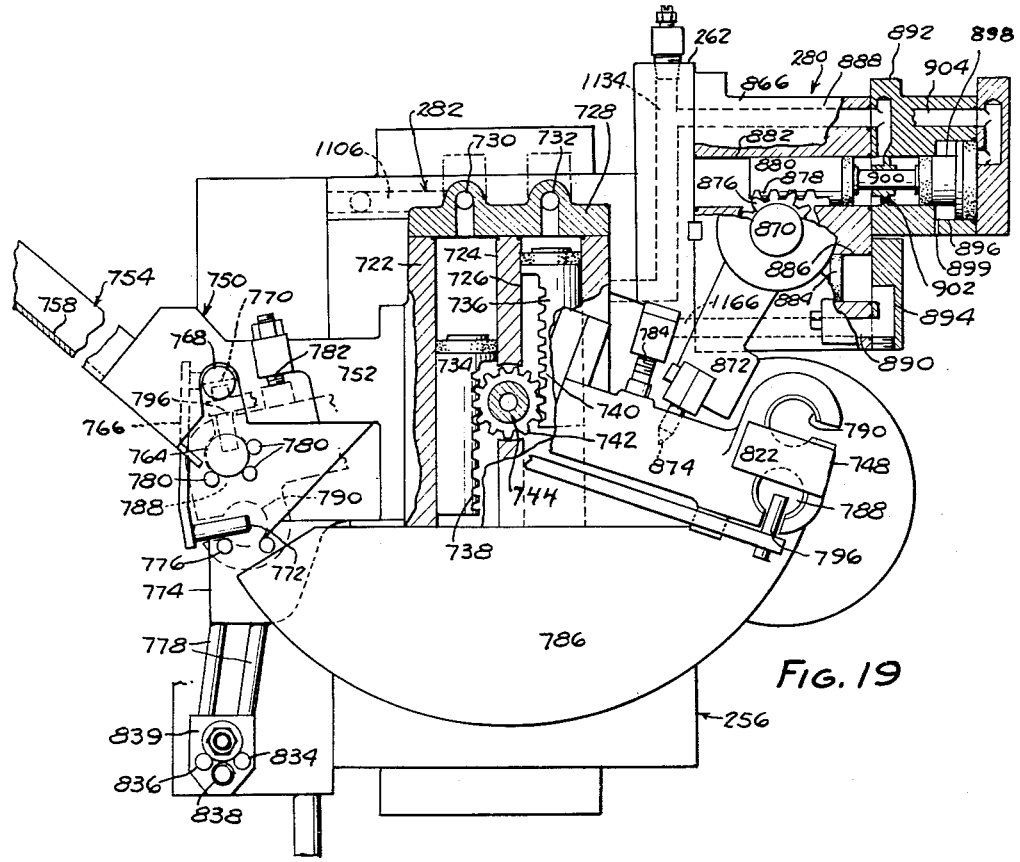
FIG. 19
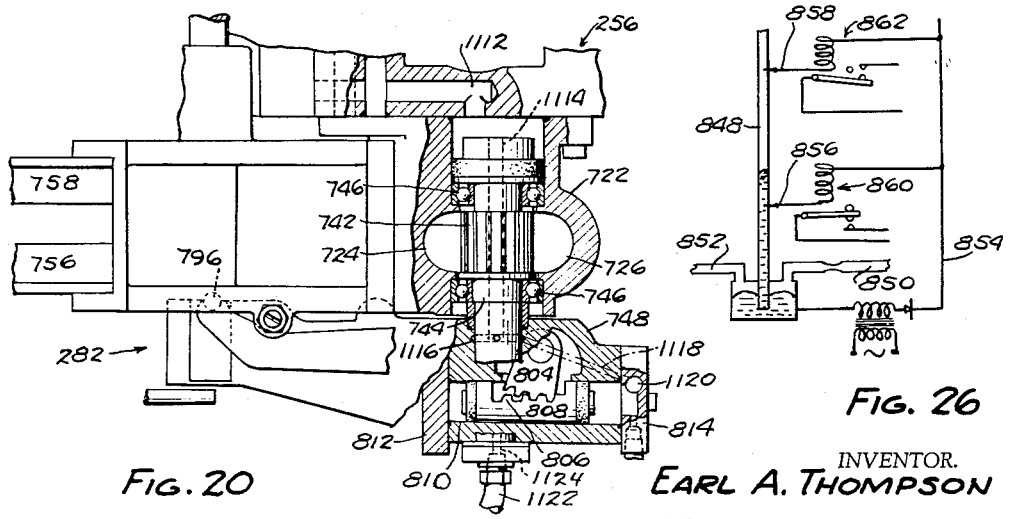
FIG. 20
FIG. 26
INVENTOR.
EARL A. THOMPSON
BY
Ralph L. Tweedel
ATTORNEY

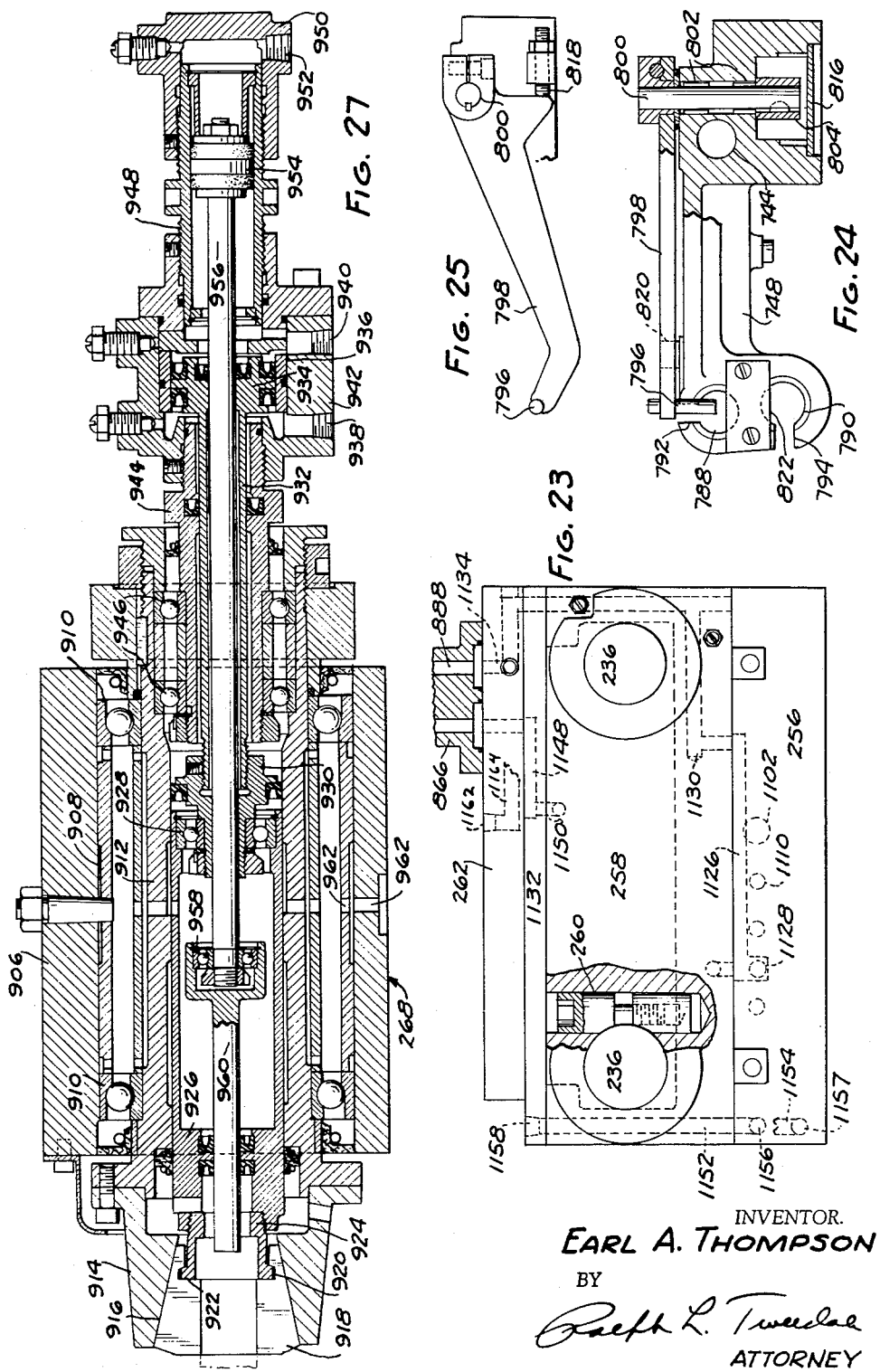

INVENTOR.
EARL A. THOMPSON

Oct. 10, 1961 E. A. THOMPSON 3,003,292
INTERNAL GRINDER
Filed Nov. 12, 1957 20 Sheets-Sheet 19

INVENTOR.
EARL A. THOMPSON
BY
Ralph L. Tweedale
ATTORNEY

INVENTOR.
EARL A. THOMPSON
BY
Ralph L. Tweedale
ATTORNEY

United States Patent Office 3,003,292
Patented Oct. 10, 1961

3,003,292
INTERNAL GRINDER
Earl A. Thompson, 1300 Hilton Road, Ferndale 20, Mich.
Filed Nov. 12, 1957, Ser. No. 695,611
41 Claims. (Cl. 51—50)

This invention relates to machine tools and more particularly to machine tools of the class wherein shiftable carriages are mounted for perpendicular relative movement and provided with suitable automatic controls for machining work pieces with high accuracy and at high production rates.

More particularly it is an object of this present invention to provide an improved machine tool construction adaptable for such uses as grinders and precision boring and turning machines having an improved arrangement of frame and carriages in which the tool and the work are mounted upon individual carriages in such a way that the work piece and the tool, when operatively engaged, are rigidly supported for respective traversing and in-feeding motions.

Another object of the invention is to provide, in a machine tool of the class described, a frame construction which includes horizontally extending tool carriage ways having a tool spindle carriage projecting horizontally therefrom, together with a generally C-shaped frame structure having vertical ways spaced a further distance horizontally away from the horizontal ways and supporting a work carriage.

It is also an object of the present invention to provide, in a machine tool of the class described, an arrangement for supporting the work carriage adjacent the center of gravity whereby the effects of variations in the way friction and carriage deflection due to cantilever loading of the work carriage may be minimized.

It is also an object of the invention to provide, in a machine tool of the class described, an improved feeding arrangement for exerting a continuously biasing force on the carriage, together with an oppositely acting mechanism for feeding the carriage and positioning it with greater accuracy than heretobefore attainable.

Another object is to provide a machine tool having a feed mechanism of this class wherein a hydraulically operated inclined plane may be propelled between predetermined adjustable positions to control the position of the carriage.

It is a further object to provide such a feed mechanism wherein a shiftable abutment member of adjustable length may be incorporated for the purpose of independently imparting feed motions to a carriage.

A further object is to provide a grinder in which the wheel may be dressed lightly prior to final grinding of each piece against a dresser which has a predetermined positional relation to the work and to control in-feeding between dressing and final grinding with a corresponding positional relation whereby the finished work dimension may be accurately maintained upon successive pieces.

Another object is to provide an improved machine tool for grinding parts with high precision in which a work holding carriage is provided with a grinding wheel dresser which has a predetermined positional relation with respect to the work piece and wherein is provided an automatic cyclic control means which may operate a work carriage and a grinding wheel spindle carriage to cause the wheel to be dressed prior to final grinding of each piece, while the work carriage is retracted against a fixed abutment and which may thereupon advance the work carriage against an opposing fixed abutment for determining the size of the finished work piece.

It is also an object of the present invention to provide a grinder with such a cyclic control means in which the carriage retraction abutment may be variably positioned to correct for small variations in the size of successive work pieces automatically.

Another object is to provide such a grinder in which work handling means are coordinated with the cyclic control means so as to automatically remove finished work pieces and replace them with unfinished work pieces in a continuous cycle.

Another object is to provide such a grinder wherein the work handling means include a gaging station and a sensing device whereby the output of finished parts may be automatically maintained within predetermined limits of size.

It is also an object of the present invention to provide means controlled by such a gaging device for automatically adjusting a grinding machine to compensate for predetermined changes in the trend of successive gage readings.

A further object is to provide an improved traverse carriage oscillator for use in grinders of the class described in which the carriage may be oscillated through more than one predetermined mode of vibratory movement, one of which may be suitable for a grinding operation and the other of which suitable for a wheel dressing operation.

Another object is to provide in a machine tool of the class described such an oscillator wherein the carriage may be selectively operated by either one of a plurality of mechanically driven cams.

It is also an object to provide such a machine tool wherein the traverse carriage may be controlled by an oscillator mechanism to impart vibratory motion and which has means for advancing and retracting the traverse carriage independently of the oscillator mechanism to provide clearance for wheel dressing and work piece changing operations.

Still another object is to provide in a grinder of the class described a cyclic control mechanism for automatically initiating a cycle of grinding wheel dressing operations suitable for dressing a newly installed wheel to proper size and accuracy prior to a start of automatic work piece grinding operations.

Further objects and advantages of the present invention will be apparent from the following description, reference being had to the accompanying drawings wherein a preferred form of the present invention is illustrated.

In the drawings:
FIGURE 1 is a perspective view of an internal grinder.
FIGURE 2 is a top view of the grinder illustrated in FIGURE 1 with a portion of the mechanism broken away.
FIGURE 3 is a fragmentary view from the right end of the device shown in FIGURE 1 with the work piece handling mechanism omitted.
FIGURE 4 is a fragmentary sectional view taken on line 4—4 of FIGURE 2.
FIGURE 5 is a fragmentary view, partially in section, on line 5—5 of FIGURE 2, showing a portion of the work carriage feed mechanism.
FIGURE 6 is a sectional view on line 6—6 of FIGURE 5.
FIGURE 7 is a top view of the feed box illustrated in FIGURES 5 and 6.
FIGURE 8 is a vertical section on line 8—8 of FIGURE 7.
FIGURE 9 is a fragmentary sectional view on line 9—9 of FIGURE 8.
FIGURE 10 is a fragmentary sectional view of a step-by-step compensator associated with the feed box and is taken on line 5—5 of FIGURE 2.
FIGURE 11 is a cross section on line 11—11 of FIGURE 10.
FIGURE 12 is a longitudinal sectional view of an oscillator mechanism and is taken on line 12—12 of FIGURE 2.

FIGURE 13 is a horizontal view of the oscillator mechanism shown in FIGURE 12 with a portion of the housing broken away.

FIGURE 14 is a fragmentary sectional view on line 14—14 of FIGURE 13.

FIGURE 15 is a fragmentary sectional view on line 15—15 of FIGURE 13.

FIGURE 16 is an end view of the oscillator mechanism viewed from the right in FIGURE 12.

FIGURE 19 is a right end view, partially in section, of a portion of the grinder shown in FIGURE 1 illustrating the work handling and wheel dressing mechanism.

FIGURE 20 is a top view, partially in section, of the mechanism shown in FIGURE 19.

FIGURE 23 is a top view of the work carriage.

FIGURE 24 is a view of a work handling arm.

FIGURE 25 is a top view of a work loading lever forming part of the mechanism illustrated in FIGURE 24.

FIGURE 26 is a view of a gaging and sensing mechanism forming part of the machine illustrated in FIGURE 1.

FIGURE 27 is a longitudinal section of a work spindle showing collet actuating and work ejecting mechanism.

*Frame and carriages*

Figure 1:
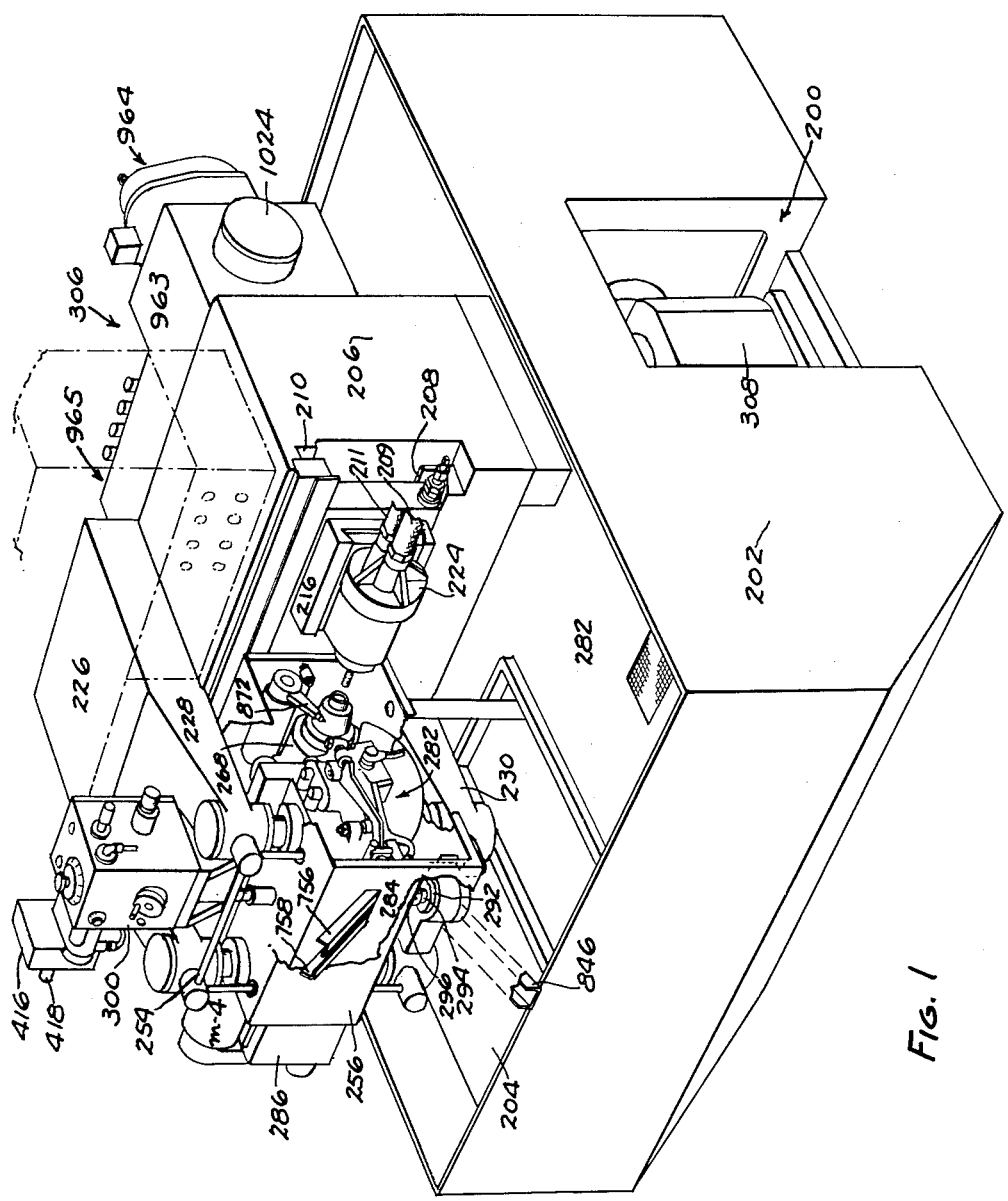
Figure 2:
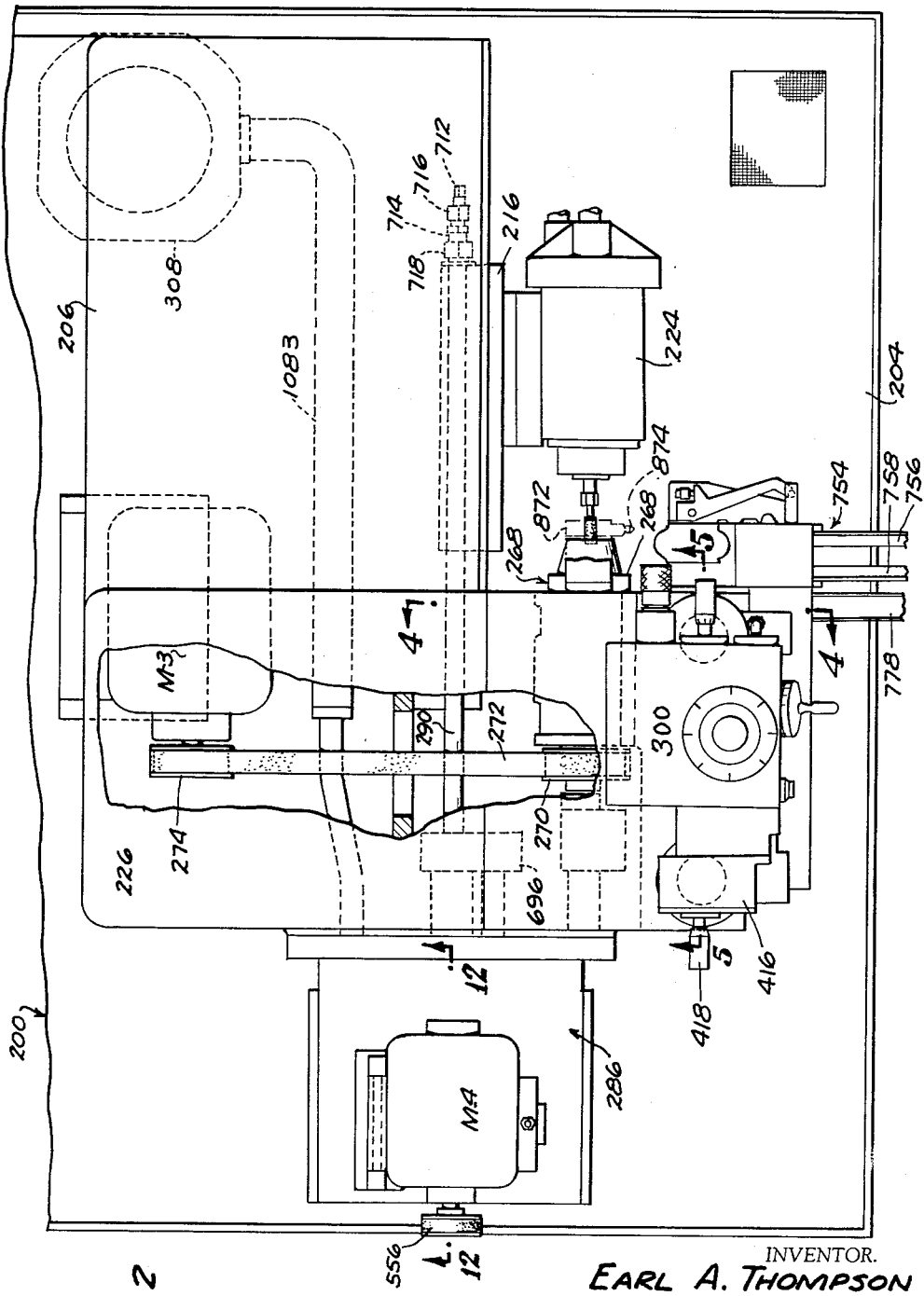
Figure 3:
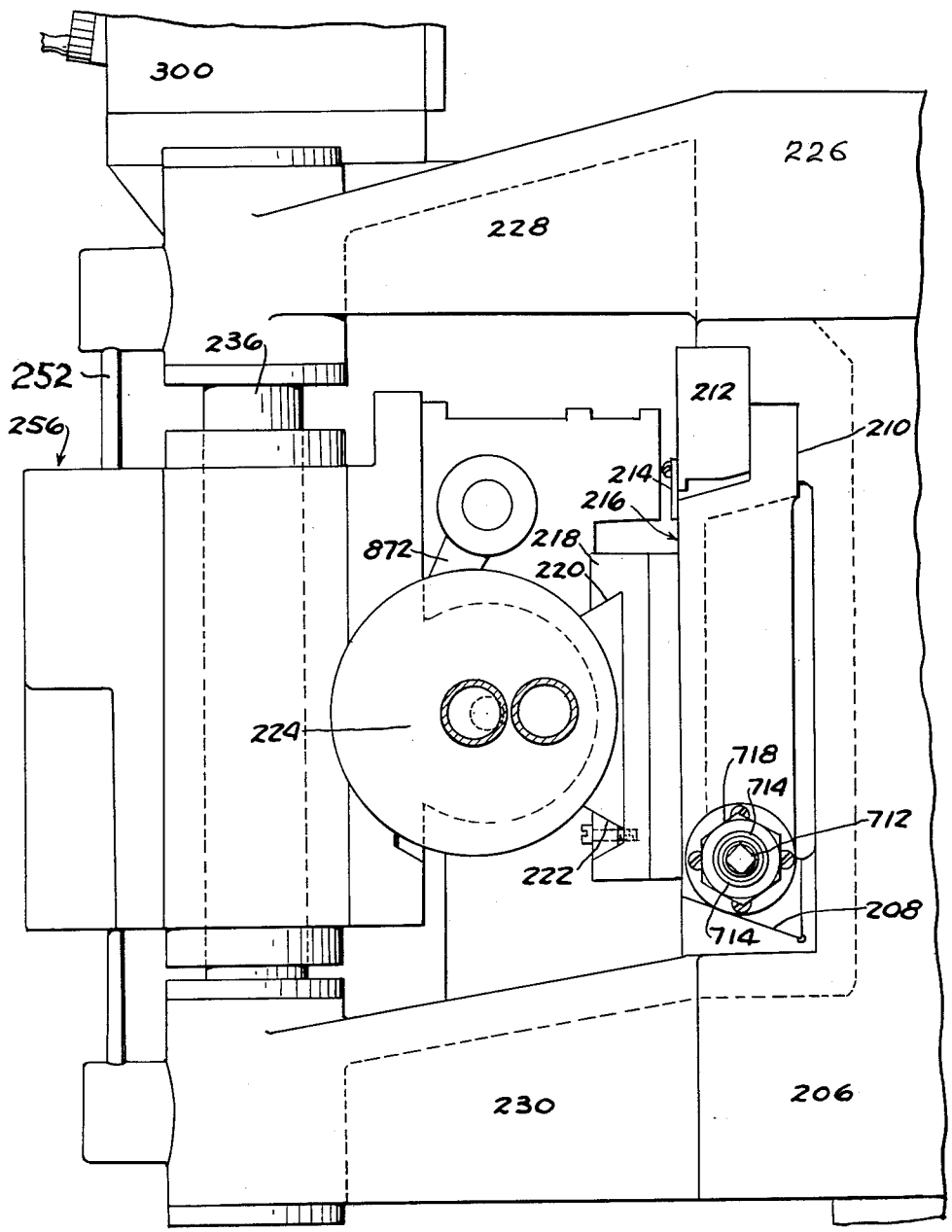
Figure 4:
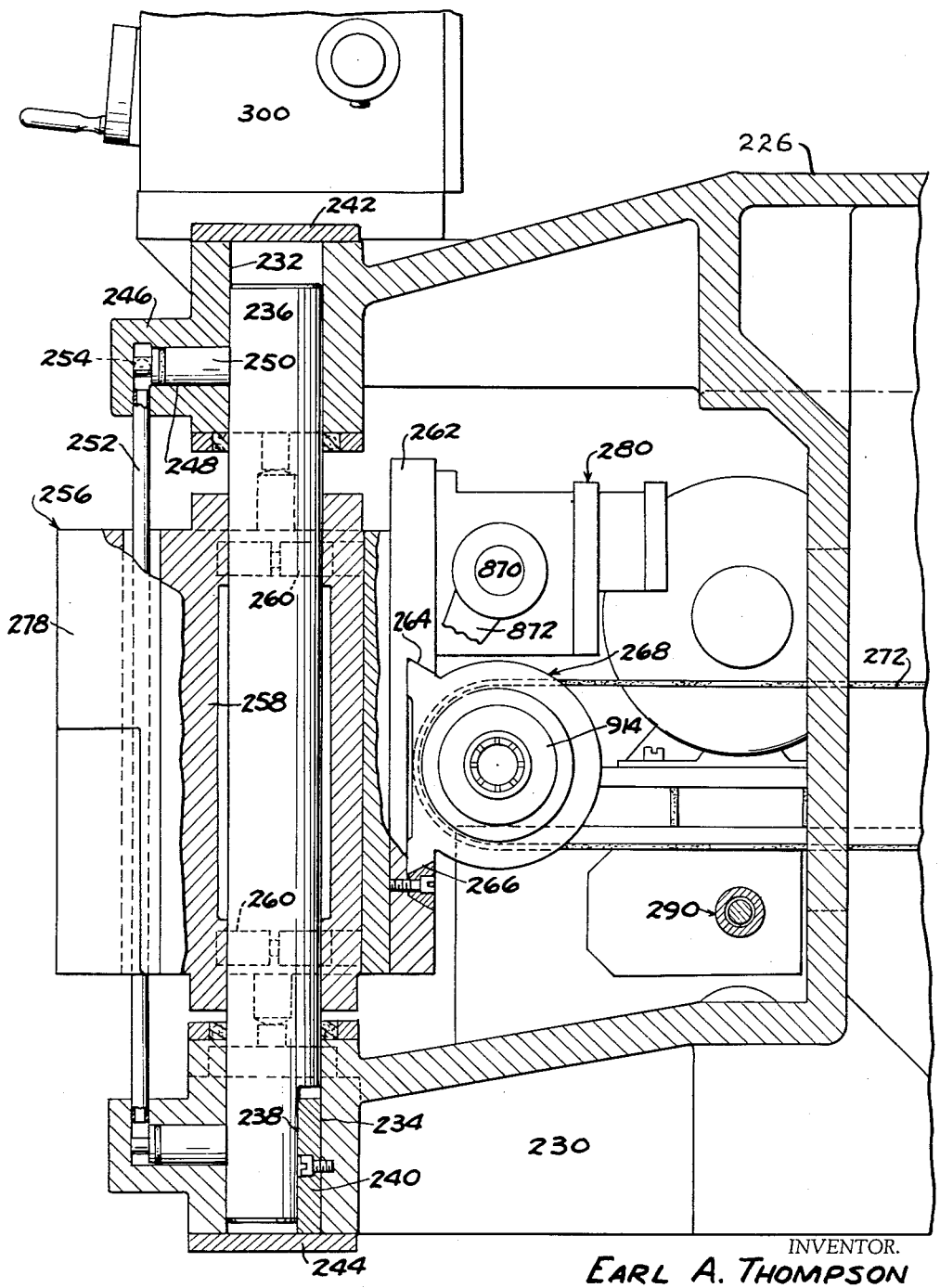

Referring to FIGURES 1, 2, 3, and 4, the basic structure of the machine illustrated comprises the main frame structure 200 which has a large horizontally extending base 202 provided with a coolant collecting recess 204 extending horizontally along the front portion thereof. The right-hand upper portion of the frame 200 comprises a vertically extending box-like structure 206, upon the front vertical face of which there is provided a pair of recessed carriage ways 208 and 210. The way 208, as shown more clearly in FIGURE 3, is a V-way, while the way 210 may be rectangular and closed by a bar 212 and cover shoe 214 removably secured to the frame section 206.

Slidably mounted in the ways 208 and 210 is a grinding wheel carriage generally designated 216. The carriage 216 carries a sub-plate 218 provided with V-ways 220 and 222 within which is adjustably secured a motor driven high speed precision grinding wheel spindle 224. The spindle is preferably of the hydraulic turbine type, and a hydraulic fluid system, not shown, may be located in the base 200 and connected to the spindle by hoses 209 and 211. The tool carriage 216 may be reciprocated horizontally in the ways 208 and 210 by mechanism later to be described.

The left-hand portion of the main frame structure 200 includes a vertically upstanding hollow box section 226 which has near its top and bottom portions a pair of horizontal support arms 228 and 230. These arms extend to the left in FIGURES 1 and 3 a distance beyond the axis of the spindle 224 and are provided with pairs of aligned vertical bores 232 and 234, each shown more clearly in FIGURE 4. The box section 226, together with the arms 228 and 230, form a generally C-shaped structure, the open arms of which extend horizontally toward the front of the machine.

Slidably mounted within the bores 232 and 234 is a pair of vertically extending cylindrical columns 236. The columns 236 are flattened on their lower portions as shown at 238 in FIGURE 4, and the bore 234 is provided with a chord block 240 for preventing rotation of the columns 236. The ends of the bores 232 and 234 are closed by cover plates 242 and 244, respectively. Formed in the front face of the arms 228 and 230 are four bosses 246 within which are formed bores 248 intersecting the vertical bores which receive the columns 236. Slidably positioned in each bore 248 is a clamp piston 250. The ends of the four bores 248 are connected together by two vertical pipes 252 and one horizontal pipe 254, so that the four pistons, 250, may be simultaneously exposed to hydraulic pressure for the purpose of clamping the columns 236 rigidly to the upper and lower support arm.

The columns 236 carry rigidly clamped thereto a work carriage or head generally designated 256. The central section 258 of the work carriage may be secured to the columns by tangent clamps 260 illustrated in FIGURES 4 and 23. Secured to the rear face of the carriage member 258 is a sub-base 262 provided with adjustable V-ways 264 and 266 upon which a work spindle generally designated 268 may be mounted. The work spindle 268 has a drive pulley 270, as shown in FIGURE 2, which is connected by a belt 272 with a pulley 274 mounted on a drive motor M–3 which is positioned within the hollow box section 226 of the main frame 200.

Secured to the front face of the carriage member 258 is a counterweight 278, which is shaped to provide clearance for the vertical pipes 252. The sub-base 262 forms a mounting for a wheel dressing assembly generally designated 280 which is mounted in fixed relation to the spindle 268. The work carriage 256 also carries on the right-hand end a work piece loading and unloading mechanism generally designated 282 and upon the front face of the counterweight 278 there is mounted a work gaging and sensing mechanism generally designated 284.

At the left-hand end of the hollow box section 226 of the main frame 200 there is mounted an oscillator mechanism generally designated 286, as is shown in FIGURE 2. The oscillator has an output shaft 290 which is adjustably associated with the wheel carriage 216 for the purpose of reciprocating the latter upon its ways. Mounted near the mid portion of the lower horizontal arm 230 of the main frame 200 is a hydraulic cylinder 292, FIGURES 1 and 5, having a piston rod 294 which abuts a stationary block 296, rigidly secured to the bottom of the work carriage 256. The piston 298 may be subjected to a constant hydraulic pressure sufficient to more than counterbalance the total weight of the work carriage 256 and its associated parts. Secured to the upper surface of the top frame arm 228 is a feed box generally designated 300 which has an operating rod 302 projecting from its lower face and contacting an abutment block 304 secured to the upper portion of the work carriage 256. The rod 302 may be moved upwardly and downwardly to retract and advance the carriage with and against the bias produced by the counterbalance piston 298.

At the rear of the machine is a mechanico-hydraulic cyclic control and drive mechanism generally designated 306. This is a self-contained driving and controlling unit which is connected with the various moving parts through hydraulic conduits and has certain cyclic electrical controls associated therewith, as will be described hereafter.

Positioned in the lower portion of the base 202 is a return oil-hydraulic accumulator 308 which forms a source of fluid under pressure available, as later described, for the purpose of biasing various movable parts in a direction opposite to the motion induced by the mechanico-hydraulic unit 306. A suitable coolant circulating system, not illustrated, may be mounted within the base portion 202 for the purpose of circulating cooling fluid to the work grinding zone in the well known manner.

Work carriage feed

Figure 6:
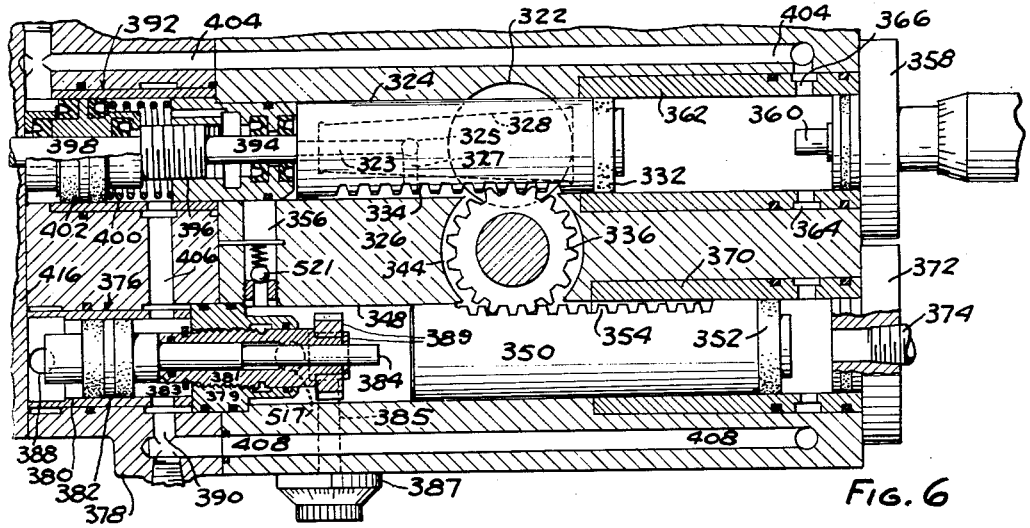
Figure 7:
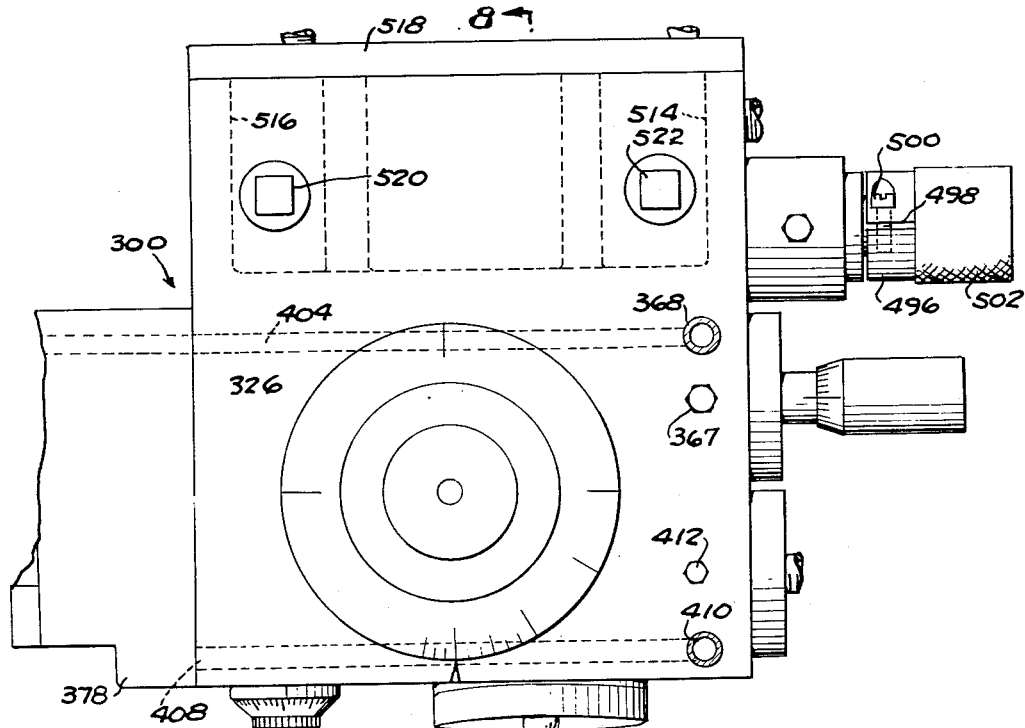
Figure 8:
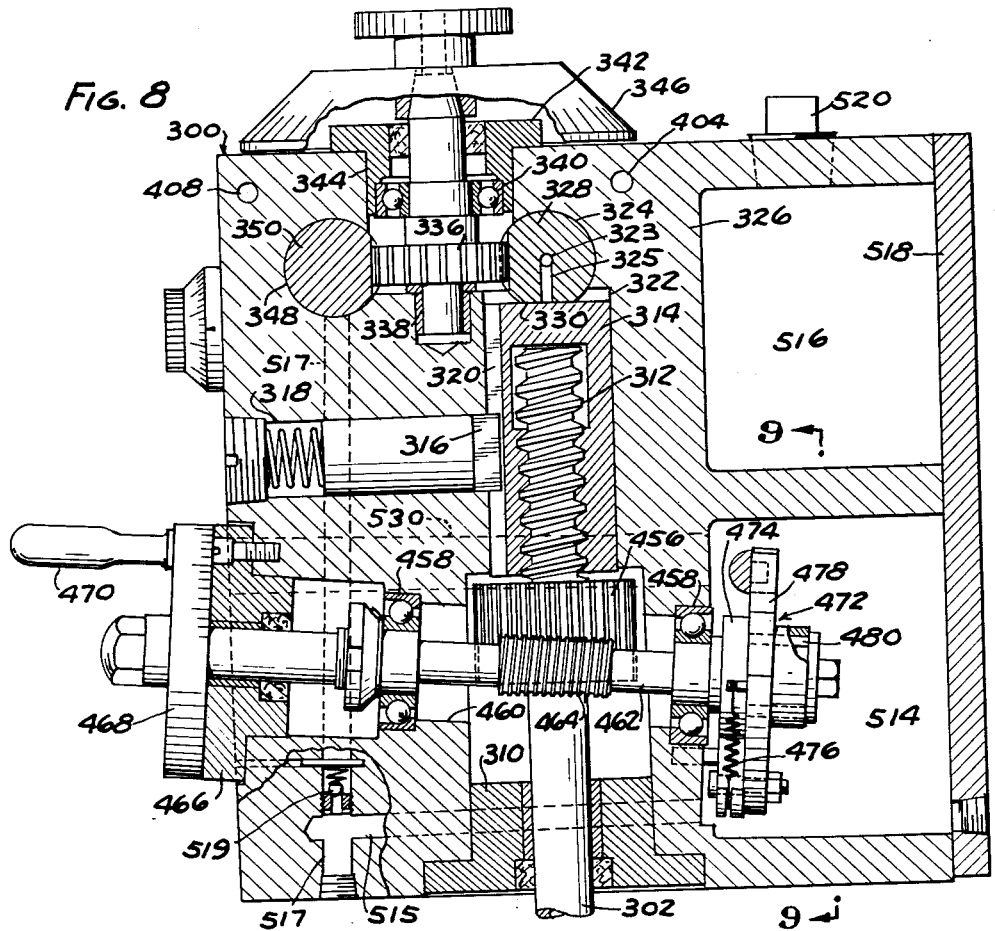

Referring now to FIGURES 5 through 9, the control of the work carriage 256 is obtained through a mechanism contained in the feed box 300 which operates through the medium of the rod 302 to oppose the bias of the counterbalance piston 298. As shown in FIGURE 8, the rod 302 is slidable in a bushing 310 and is arranged to have its total length varied by an incremental feed mechanism later to be described. For this purpose the upper end of rod 302 is provided with a thread 312 on which is screwed a nut 314. A key 316 is spring pressed in a bore 318 to engage a keyway 320 formed on the nut 314 to prevent its rotation. The key and keyway have tapered sides so that angular back-lash is automatically taken up by the spring pressed key.

At the upper end of the bore 322, in which nut 314 is slidably mounted, there is an intersecting horizontal bore 324 in the main casting 326 of the feed box 300. Slidable in the bore 324 is a wedge 328 having an inclined plane formed on its lower surface 330 and provided with a cylindrical right-hand end, as shown in FIGURE 5, to form a hydraulic piston. A suitable packing 332 may be mounted on the right-hand end of the wedge 328. The upper end of nut 314 is preferably inclined upon the same angle as the wedge surface 330. The wedge 328 is also provided with a toothed rack 334 along one side for the purpose of meshing with a pinion 336, the shaft of which is journaled in bearings 338 and 340. The latter is carried in a flanged sleeve 342 which closes the upper end of a bore 344 receiving the pinion 336. A graduated dial 346 may be secured to the upper end of the shaft of pinion 336.

Parallel to the bore 324 there is formed in the body 326 a second bore 348 for receiving a piston 350 having a packing 352 at its right-hand end and a rack 354 along its side and arranging to mesh with the pinion 336. A passage 356 connects the left-hand ends of the bores 324 and 348. Closing the right-hand end of the bore 324 is a cover plate 358 which carries a threaded micrometer stop pin 360. The latter may be adjusted to various positions to form an abutment limiting the extent of motion of wedge 328 to the right in FIGURES 5 and 6. The right-hand end of bore 324 may be enlarged and provided with a liner 362. The latter is provided with an annular groove 364 near one end which connects through one or more radial openings 366 with the interior of the liner. Groove 364 connects also with an air bleed valve 367, FIGURE 5, for the purpose of initially filling the cylinder and also communicates with a terminal connection port 368, FIGURE 7, for connection with the mechanico-hydraulic control unit. The right-hand end of bore 348 may be provided with a liner 370 similar to the liner 362 and the end may be closed by an end cover 372 having a terminal connection 374 for communication with the return oil accumulator 308.

At its left-hand end the bore 348 is provided with a mid position stop assembly generally designated 376. This may comprise a cylinder body 378, which forms an extension for the bores 324 and 348, and has a cylinder 380 within which is slidably mounted a piston 382. The rod 384 of the piston 382 extends into the cylinder 348 when projected to the right. The left end of bore 380 has a hydraulic connection terminal 388. Transverse passage 390 communicates with the right-hand end of bore 380.

For the purpose of adjustably limiting the right-hand motion of piston 382 and rod 384, there is provided a head member 379 having a central opening which is threaded at its left-hand portion and has a sliding seal at its right-hand portion. An adjustable stop sleeve 381 is threaded in the head 379 and abuts the shoulder 383 on piston 382 in its right-hand portion, illustrated in FIGURE 6. For turning the sleeve 381, a transverse shaft 385, having a graduated knob 387, is provided and is connected to the sleeve 381 by gears 389.

The body 378 may also extend across in FIGURE 6 to form a closure for the left end of bore 324 and to carry an adjustable retract-position stop generally designated 392. The latter comprises a stem 394 which is threaded at 396 in the body 378 and has an extension 398 which runs through a stepping motor later to be described. To the left of the threaded portion 396 there is formed a bore 400 which receives an annular piston 402 freely slidable upon the rod stem 398. In the position illustrated, the ends of the piston are clamped against the left end wall of the cylinder 400 and the left-hand end of the threaded portion 396, thus holding the piston 402 stationary.

The left-hand end of bore 400 communicates by passage 404, FIGURE 7, with the annular groove 364 and the terminal connection 368. The right-hand end of bore 400 communicates with the right-hand end of bore 380 by a passage 406. The latter has a branch 408, FIGURE 7, extending to the right and communicating with a terminal connection 410 for return oil from the accumulator. A bleed valve 412, similar to the valve 367, may be provided for the right end of bore 348.

Figure 10:
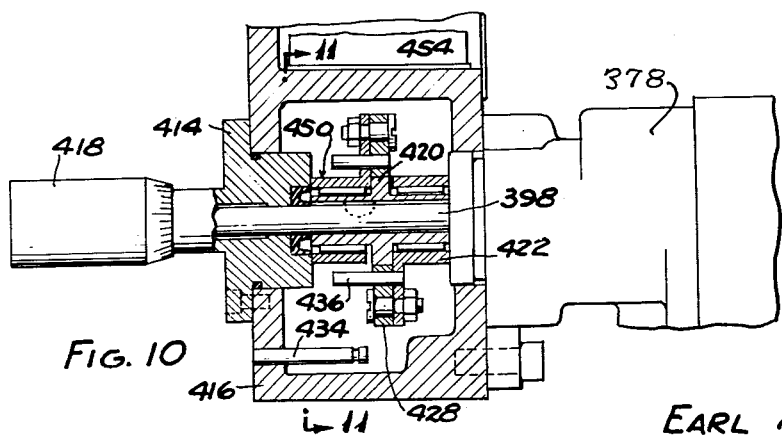
Figure 11:
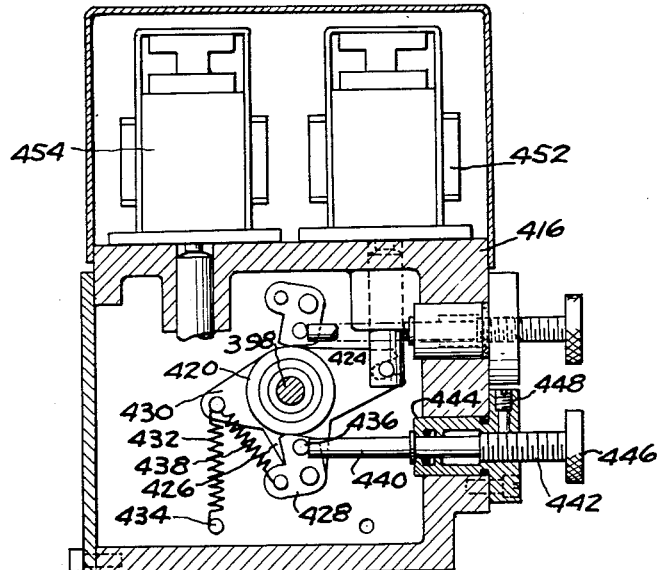

Referring to FIGURES 10 and 11, the stepping motor for the stem 398 is there illustrated. The stem extends through a flange bushing 414 formed in a hollow body 416 attached to the left end of body 378. The extreme left end of stem 398 is provided with an index handle 418. The stem 398 has keyed thereto a driving rotor 420 which is formed with a central cylindrical flange and projecting cylindrical sleeves at either end. The central flange serves as a driven member for a pair of stepping pawls. Journaled on the right-hand sleeve portion of the rotor 420 by means of needle bearings is a pawl carrier 422. The latter is formed with three radially projecting arms, which are better illustrated in FIGURE 11, and comprise the forked actuator arm 424, the downwardly extending arm 426, which carries a pawl 428 pivoted thereto and normally engaging the driven rotor 420 and the leftwardly extending spring engaging arm 430 which is connected by a spring 432 with a stationary pin 434 at the lower portion of the casing. The pawl 428 has pressed therein a stop pin 436 and is also normally urged clockwise in FIGURE 11 by an extension spring 438.

An adjustable stop pin 440 is threaded at 442 in a bushing 444 mounted in the front wall of the housing 416 and has a knob 446 at its outer end which may be locked by a set screw 448 in the bushing 444. Positioned similarly on the left-hand sleeve of the rotor 420 is another pawl carrier assembly generally designated 450 which has corresponding parts arranged for the opposite direction of action and the construction of which will be obvious by the preceding description. A pair of solenoids 452 and 454 have their operating stems projecting downwardly into the housing 416 and connected by pins with the forked ends of the operating levers of the two pawl carriers 422 and 450, respectively.

Referring again to FIGURE 8, the operating mechanism for extending and collapsing the rod 302 comprises a gear 456 keyed to the rod 302 below the thread 312. Journaled on bearings 458 in an inclined transverse bore 460 is a worm shaft 462 carrying a worm 464 meshing with the gear 456. The left-hand end of shaft 462 projects through a flange bushing 466 and has keyed thereto a hand wheel 468 carrying a crank handle 470 for manual rotation of the worm. At its right-hand end in FIGURE 8 the shaft 462 carries a stepping device generally designated 472 and illustrated in FIGURE 9. Keyed to the shaft 462 is a driving rotor 474 having a cylindrical section and coacting with a friction pawl 476 to produce a one-way driving connection. The pawl 476 is carried by a disc-like carrier 478 journaled on bearing 480 upon the right-hand end of shaft 462.

The pawl carrier 478 has a radial slot 482 which connects by a pin with the right-hand end of a piston rod 484. The latter is provided with a piston 486 reciprocable in a cylinder body 488 mounted in an end wall of housing 326. The piston 486 reciprocates in a cylindrical bore 490, the right-hand end of which has a connection passage 492 formed in the wall of the body 326 and leading to the return oil accumulator. The left-hand end of the bore 490 is closed by an end cap 494 which carries threaded on its outer end a nut 496 which is split at 498 for locking by means of a clamp screw 500, FIGURE 7. A cup member 502 is pressed on the left-hand end of nut 496 to enclose the end of the threaded flange 494. The piston 486 has a rod 504 which extends through the flange 494 and has a transverse stop pin 506 pressed therein and slidably related to a pair of slots 508 formed in the threaded portion of flange 494. The pin 506 is longer than the diameter of the threaded portion so that the left-hand end of nut 496 forms a limit stop for rightward movement of the piston 486 by abutment with the pin 506. The body 488 is provided with a hydraulic connection terminal 510 and a bleed valve 512 at its left-hand end.

The feed box is preferably utilized as a lubricant reservoir and for this purpose is formed with hollow cavities, one of which is indicated at 514 and the other at 516. The two reservoirs are formed as open cores in the side of the body 326 and are closed by a common cover plate 518. Filler plugs 520 and 522 close the filler openings for each reservoir. A staggered wall, shown by dotted lines in FIGURE 5 at 524, separates the two reservoirs. Suitable sight glasses 526 and 528 may be set into the front face of the feed box and connected with their respective reservoirs by bores 530 and 532 extending rearwardly from the sight glasses, see FIGURE 9.

Figure 9:
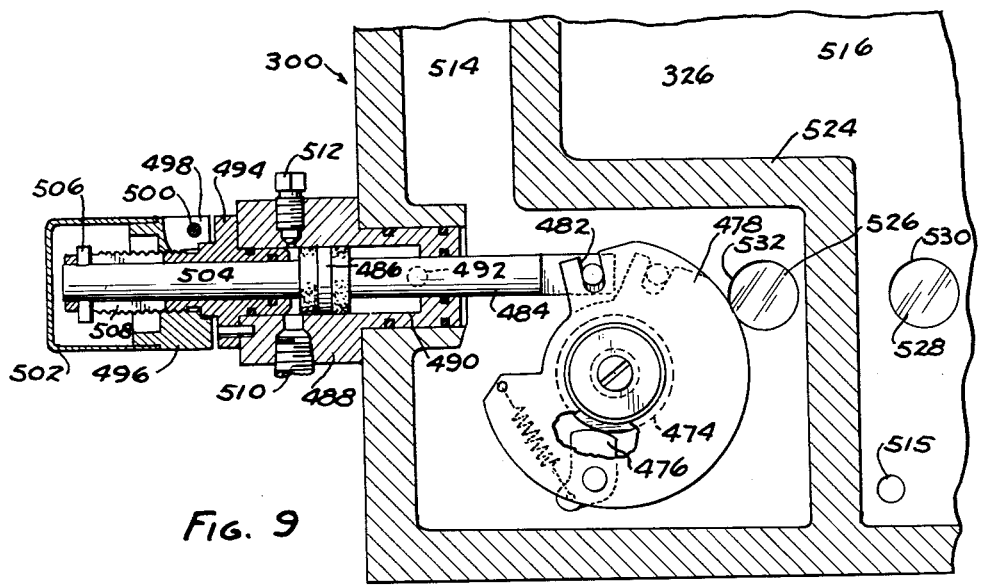

One reservoir 514, for example, may contain spindle oil for lubricating the high speed precision spindle 224. The other reservoir 516 may be utilized for lubricating the ways and bearings and, for this purpose, pipelines and plumbing of any suitable construction, not shown, may connect from the reservoir to the ways and other points to be lubricated. The feed wedge 328, being above the reservoir 516, there is provided a two-stage pumping arrangement for lifting lubricant to the level of the pistons 328 and 350 and for producing pressure to lubricate the wedge 328. For this purpose the displacement of the pistons 332 and 350 in their left end chambers in FIGURE 6 is utilized to cause a two-stage pumping action. Thus, an inlet or suction passage 515, see FIGURES 8 and 9, is drilled horizontally near the base of the feed box to intersect a vertical passage 517 leading to the left-hand end of cylinder 348 in FIGURE 6.

In the lower portion of passage 517, there is mounted a check 519 opening to free flow upwardly in the passage 517. A similar check valve 521 is provided in the cross bore 356 which connects the two left-hand ends of cylinders 324 and 348 and opens to flow from the latter into the former. The piston 328 is provided with a lubricant delivery passage 323 terminating in a vertical branch 325 opening to the surface of the wedge 330. A horizontal branch 327 delivers lubricant to the rack 334. Thus, the piston 350 acts as a first stage lubricant pump at its left-hand end, with check valve 519 as the inlet valve and check valve 521 as the outlet valve. Piston 332 on the other hand utilizes check valve 521 as its inlet valve and delivers its discharge through the passages 323, 325 and 327.

Wheel carriage oscillator

The oscillator mechanism generally designated 286 is shown in detail in FIGURES 12 through 16 and comprises a rectangular box-like housing 534 having top, bottom and end walls cast preferably as an integral structure and provided with front and rear cover plates 536 and 538. The right-hand end wall is provided with a hydraulic manifold plate 540 having a plurality of hydraulic passages (FIGURE 16) 542, 544, 546, 548, 550, and 552 formed as open cores in the left-hand face of the plate 540 which become closed passages when bolted to the end face of the housing 534 as shown in FIGURE 12.

Mounted on top of the housing 534 is an electric motor M–4 which connects by a belt drive 556 with an input shaft 558 journaled on bearings 560 and 562. The latter is carried in a removable flanged plug 564 secured to the right end wall of the housing 534 while a retainer and sealing flange 566 is provided at the left-hand end of shaft 558. A central boss 568 is provided on the upper face of the floor of housing 534 to form a central bearing for a cross drive shaft 570, suitable bearings 572 being mounted in the boss 568, as shown in FIGURE 13. The shaft 570 is driven from the shaft 558 by a worm 574 and wheel 576.

Freely journaled and entirely supported upon the cross shaft 570 adjacent to its outer ends are two rockable cam carriers 578 and 580, respectively. These are in the form of dumbbell links to provide bearings 582 and 584 which support the links upon the shaft 570 and bearings 586 and 588 which carry driven cam shafts 590 and 592. Drive gearing 594, 596, 598 and 600 forms a continuously connected rotary drive between shaft 570 and the cam shafts 590 and 592. At their inner ends the cam shafts each carry a cam 602 and 604, while the cam shaft 592 carries, in addition, a cam 606 at its lower end in FIGURE 13.

Mounted in horizontally extending bosses 608 formed on the left end wall of the housing 534 is a transverse trunnion shaft 610 which carries a dual follower rocker arm assembly 612. The latter has a longitudinal bearing portion 614 and a pair of downwardly extending follower arms 616 and 618 which are forked at their lower ends to receive follower rollers 620 and 622. Roller 620 is in coplanar alignment with cam 602 while roller 622 is in coplanar alignment with cam 604. Projecting upwardly from the mid-portion of the bearing sleeve 614 is a slotted lever 624. A connecting rod 626 is journaled on a pin 628 secured in the slot 630 of the arm 624. The arrangement is such that the pin 628 may be mounted in any position between the ends of the slot 630 to change the effective leverage of the arm 624 with respect to the connecting rod 626.

The connecting rod 626 carries at its right-hand end a piston 632 which is slidably mounted in the left end of a cylinder 634, which is pressed or otherwise secured in the right-hand wall of the housing 534. A circumferential groove 636 formed in the housing 534 provides communication with the mid-portion of the cylinder 634 through one or more radial openings 637 and leads through a horizontal passage 638 to the core passage 548 in FIGURE 16.

For the purpose of selectively rocking the cam carriers 578 and 580, they are provided with gear segments 640 and 642, respectively, formed integrally with each arm. The segment 640 is arranged to be operated by a double acting hydraulic ram 644 (FIGURE 15) having rack teeth 646 meshing with the segment 640. The lower end of ram 644 slides in a cylinder body 648 secured to the lower wall of the housing 534. An annular groove 650 and radial openings 652 provide communication with a passage 654 connected to a cored passage 550 carrying return oil from the accumulator. The upper end of ram 644 is carried in a similar cylinder body 656 which is similarly connected by a passage 658 with cored passage 544. A bleed valve 660 is provided in the upper end of the cylinder body 656. It will be seen from FIGURE 16 that when ram 644 is pushed upwardly to the position shown, which may be adjustably determined by a threaded stop screw 662, then the cam 602 is in operative engagement with the roller follower 620 and as the former rotates, the rocker arm assembly 612 will be rocked upon its trunnion shaft 610.

Referring now to FIGURE 14, the similar actuating ram 664 is there illustrated having a rack 666 meshing with the segment 642 of the second cam carrier 580. The lower end of ram 664 carries an enlarged piston 668 which slides in a cylinder assembly 670 secured to the bottom wall of the housing 534. A passage 672 connects between the cylinder chamber and cored passage 546 in plate 540. At its upper end the ram 664 slides in a cylinder assembly 674, which communicates by passage 676 with cored passage 552 carrying return oil from the accumulator. The cam shaft carrier 580 is shown in FIGURE 14 in its engaged position, although as explained later, this does not occur simultaneously with the other cam shaft carrier being engaged. That is to say, either one or the other is engaged, but not both at any time. When the cam shaft carrier 580 is in the engaged position, as shown in FIGURE 14, the cam 604 engages follower roller 622 and the cam 606 contacts a follower roller 678 carried by a piston rod 680. A piston 682 carried by the rod 680 slides in a cylinder assembly 684 mounted in the left end wall of the housing 534. A closure cap 686 has a hydraulic connection 688 and a bleed valve 690. The piston 682 serves as an oscillator pump when driven by cam 606 in a manner later to be described.

Referring now to FIGURES 12 and 13, the cylinder sleeve 634 projects through the right-hand end of housing 534 and has a cylinder head block 692 secured to the end of the sleeve by studs 694. The head 692 has a horizontal extension 696 carrying a passage 698 which connects with a pipe 700 to form a passage between the right-hand end of the cylinder sleeve 634 and the cored passage 542 which carries return oil. The end of cylinder sleeve 634 may be provided with openings 702 for this purpose.

For the purpose of driving the wheel carriage 216 a piston 704 is slidable in the cylinder sleeve 634 to the right of the groove 636. The piston 704 is secured to a piston rod 706 carrying an adjustable abutment sleeve 708, FIGURE 13, to form the piston rod assembly 290, FIGURE 2. The parts are illustrated in FIGURE 13 at the left-hand limit of the stroke which is determined by the abutment sleeve 708 contacting the right-hand face of the cylinder head block 696. When the piston 704 is displaced to the right, the stroke limit is determined by contact of the piston 704 with the inner wall 710 of the cylinder head 696. The distance between the abutment sleeve 708 and the piston 704 may be adjusted by a screw and nut connection 712, FIGURE 2, through which the sleeve 708 is mounted and positioned upon the piston rod 706. Thus, by moving the sleeve 708 to the left upon the rod 706, the distance between stroke limits is shortened.

The wheel spindle carriage 216 is attached to the rod assembly 290 by means of a second threaded connection 714 between sleeve 708 and carriage 216. Thus, the effective position of the carriage along the sleeve 708 may be varied without changing the length of a stroke between the abutment limits. Since the piston 704 is free to rotate within the sleeve 634 and is locked to the rod 706, the threaded adjustments may be made by merely rotating the piston rod 706 while holding the sleeve 708 stationary, or if the other adjustment is to be made, the sleeve 708 and piston 706 are locked together and they may then be threaded into and out of the carriage 216. Suitable locking nuts 716 and 718 may be provided to retain the parts in adjusted positions.

The piston 704 is operable either from the motion imparted to piston 632, which is transmitted to piston 704 through a trapped column of liquid, or it may be operated from the mechanico-hydraulic system 306 by liquid transmitted to groove 636 and through passage 638. When the oscillator cams 602 and 604 are both out of engagement with their respective followers 620 and 622, the return oil pressure which biases piston 704 to the left in FIGURE 12 and maintains the piston 632 also to the left against an adjustable stop screw 720.

*Work handling mechanism*

The work handling mechanism is illustrated in detail in FIGURES 19, 20, 22, 24 and 25.

Mounted on the right-hand face of the work carriage 256 is a work loader arm assembly comprising a stationary body 722 having a pair of parallel cylinder bores 724 and 726. The upper ends of these bores are closed by an end cap 728 having fluid passages 730 and 732 connecting with passages in the work carriage later to be described. Slidably mounted in the bores is a pair of pistons 734 and 736, respectively. The pistons are provided with toothed racks 738 and 740 which mesh with a pinion 742 formed on a shaft 744. The latter is journaled on bearings 746 in the body 722 and has keyed to its outer end a work loader arm 748. The latter is oscillatable through an arc from the position shown in solid lines in FIGURE 19 to that shown in dotted lines. Secured to the front face of the body 722 is a work piece transfer station generally designated 750 and comprising a main bracket 752 having a new piece loading chute 754 attached to its outer end in an inclined position so that cylindrical work pieces may run down the same by gravity. The chute may be formed of a pair of angle irons 756 and 758, as shown more clearly in FIGURE 22.

Figure 22:
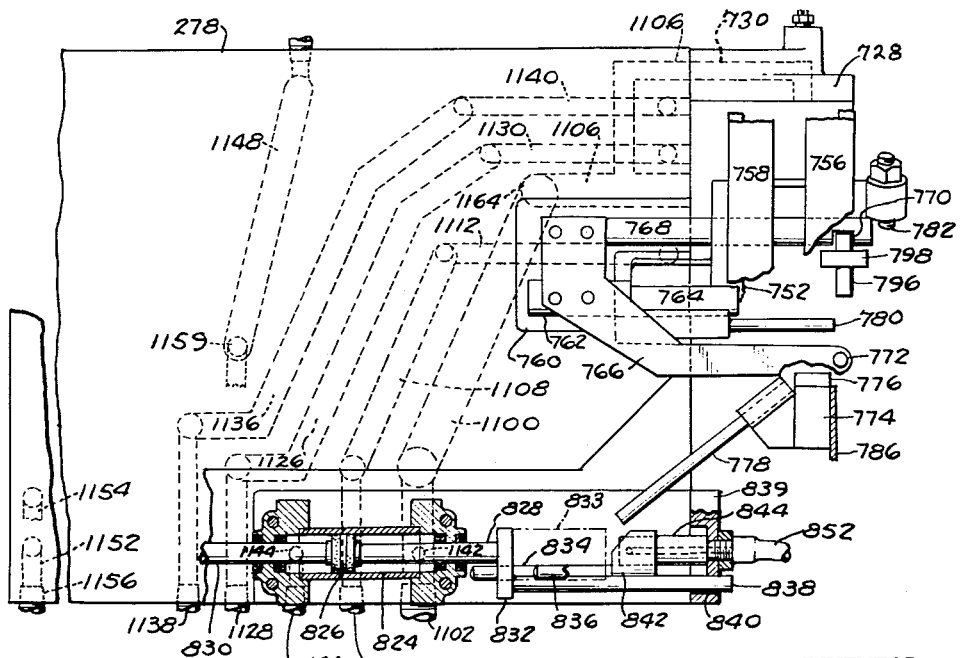
FIGURE 22 is a front view of the work carriage illustrating the work gaging apparatus.

The bracket 752, as viewed in FIGURE 22, carries a bearing boss 760 extending to the left in front of the main counterweight 278 and having a cylinder bore 762 within which a work piece shuttle is reciprocably mounted. The shuttle comprises a cylindrical pusher bar 764, the right-hand end of which, in the position shown, clears the column of parts in the chute 754. When the pusher is shifted to the right in FIGURE 22, it pushes the lowermost part of the chute ahead into the loader arm 748.

Attached to the left-hand end of the pusher 764 is a bracket 766 which carries in its upper portion a horizontal operating rod 768 which extends to the right over the chute 754 and has a slot 770 facing downwardly at its right-hand end in FIGURE 22. The bracket 766 also has a rightwardly extending arm carrying a pin 772 which serves to pull finished pieces out of the loader arm 748. The main bracket 752 carries at its lower portion an extension 774 provided with rails 776 for the reception of finished parts pulled out of the loader arm. Additional inclined rails 778 provided an exit chute which guides finished pieces downwardly to a work gaging station. The bracket 752 also is provided with horizontal rails 780 at the foot of the loader chute 754 which hold up the bottom piece in the stack of work pieces for transfer into the loader arm.

A stop screw 782 is mounted on the bracket 752 for adjustably determining the limit of swing of the loader arm. A similar stop screw 784 on the opposite side of the body 722 correspondingly limits the motion of the loader arm in the opposite direction. In order to prevent accidental displacement of the work pieces endwise during the swing of the loader arm, an arcuate plate 786 may be mounted on the bracket 774 and upon the body 722.

Referring now to FIGURES 20, 24, and 25, the loader arm is keyed to the oscillating shaft 744 and carries at its outer end two cylindrical work piece pockets 788 and 790. These pockets are of a diameter to loosely receive a work piece and have outwardly opening slots 792 and 794. The slot 794 provides clearance for the action of the pin 772, FIGURE 19 and 22, which pulls a finished work piece out of the pocket 790. The slot 792 is for clearance of a similar pin 796 which is arranged to push a new work piece into the work spindle chuck of the machine. The pin 796 is carried by a loader lever 798 which is keyed on a shaft 800 journaled on bearings 802 in the loader arm 748. As viewed in FIGURE 24, the lower end of shaft 800 has keyed thereon an operating lever 804. This lever is as seen in FIGURE 20 and has a segment of gear teeth which mesh with a rack 806 carried by a double acting piston 808. The latter is reciprocalable in cylinder 810 which is closed by end caps 812 and 814. A suitable cover 816 closes the cavity within which operating lever 804 is located. A stop screw 818, FIGURE 25, is mounted on the loader arm 748 to limit the retracted position of loader lever 798. A cylindrical headed abutment screw 820 determines the projected position of loader lever 798 and also forms an abutment for striking the stop screw 782 in FIGURE 19.

The loader arm cooperates with the work piece transfer station 750 to both eject a finished work piece from the cylindrical pocket 790 and to receive a new work piece into the pocket 788. These actions are brought about by the shuttle bar 764 and the pin 772. The shuttle assembly, comprising bars 764 and 768, is actuated by the loader lever 798 which engages the operating bar 768 by reason of the upper end of pin 796 engaging in the operating slot 772. This is shown in dotted lines in FIGURE 19 and in full lines in FIGURE 22 with the loader lever in its projected position.

The loader arm 748 is operated so as to have two stopping positions adjacent the work spindle chuck. In the first position, not illustrated in FIGURE 19, the pocket 790 is opposite the spindle to receive a finished work piece therefrom by means of an internal ejector later to be described. When the loader arm 748 is moved to its terminal position, shown in solid lines in FIGURE 19, the pocket 798 is in line with the work spindle and the loader lever pin 796 transfers a new work piece from the pocket to the chuck on the work spindle. The outer end of the work receiving pocket is partially closed by a stop plate 822.

*Work gaging mechanism*

Mounted on the front of the lower part of the work carriage counterweight 278 is a gaging cylinder 824 having a piston 826 provided with rods 828 and 830 projecting therefrom. The rod 828 carries a striker plate 832 against which the left-hand end of a work piece may abut when it slides off from the exit rails 778. A pair of horizontal guide rails 834 and 836 is secured in a bracket 839 mounted on the counterweight 278. The left-hand end of rail 834 extends through an opening in the striker plate, while the rail 836 is considerably shorter but may also pass through an opening in the striker plate 832 when the latter is projected to the right. The striker plate 832 carries, rigidly secured to it, a shuttle bar 838 slidably supported in a bushing 840 in the bracket 839. A retraction ring 842 serves to pull finished work pieces to the left in FIGURE 22 and also serves to shroud the orifice of an air operated gaging plug 844 with a reference bore of fixed diameter. The gage 844 is of the type which forms an air flow orifice between the plug and the internal cylindrical wall of the piece being gaged, or of the shroud when no piece is present.

The action of the mechanism associated with the gaging cylinder 824 is such that when the striker plate is in the position shown in FIGURE 22, a part sliding down the rails 778 will come to rest at 833 against the striker plate 832 and on the stationary rails 834 and 836. Since the center of gravity of the piece lies to the right of the end of rail 836, the piece maintains its position. Motion of the striker plate 832 to the right will slide the work piece over the gage 844 against the bracket 839 to measure its size. Thereafter the striker plate and carrier bar 838 may be pulled completely to the left and the ring 842 will carry the work piece along with it to a point where the center of gravity of the work piece passes beyond the end of rail 836 which causes the work piece to roll off from the rail 834 and the bar 838 downwardly into a delivery chute 846.

Associated with the gaging plug 844 is a dimension feed-back mechanism for the purpose of sensing the dimensional variations between successive finished work pieces. Whenever the dimension of a piece is above or below a predetermined size range, this mechanism sends a signal to the appropriate stepping solenoid in the feed mechanism and makes a corrective adjustment. As shown in FIGURE 26, a mercury manometer 848 is connected to an air supply 850 and to a line 852 leading from the gage plug 844, FIGURE 22. The glass column of the manometer has oversize and undersize contacts 856 and 858 which control a pair of relays 860 and 862 through the primary circuit 854. Relay 860 closes when deenergized and relay 862 closes when energized. The relays 860 and 862 are connected to control the stepping motors for the size adjusting mechanism in the feed box.

*Wheel dresser*

Figure 21:
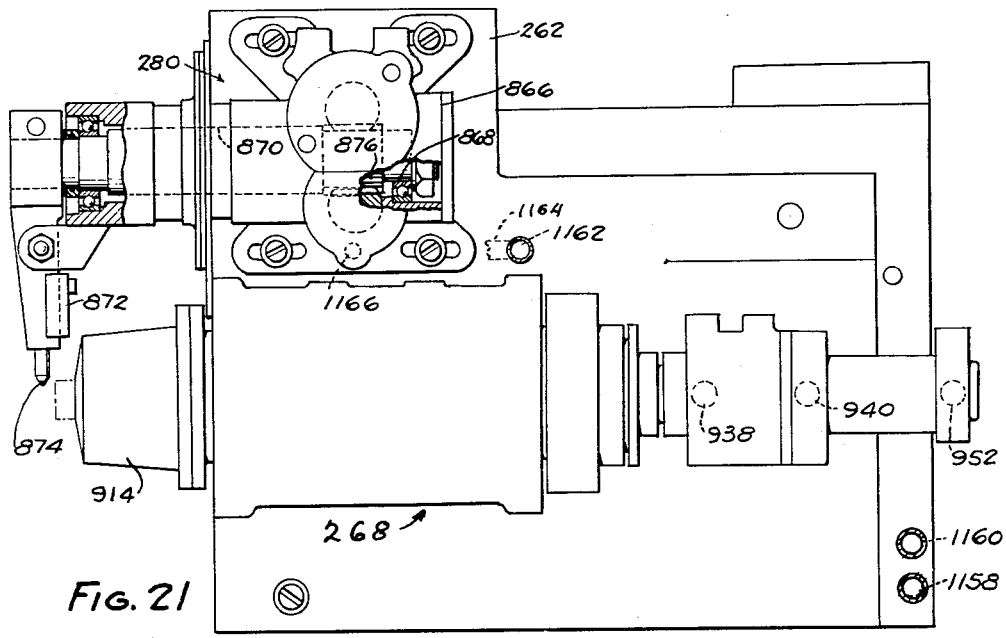
FIGURE 21 is a rear view of the work carriage showing the work spindle and wheel dressing mechanism.

Mounted on the rear surface of the work carriage on the sub-plate 262 is the wheel dresser arm assembly generally designated 280, FIGURES 19 and 21. This may comprise body member 866 which is bolted to the sub-plate 262. Journaled on bearings 868 is a dresser arm shaft 870 which carries at its outer end a dresser arm 872 having a diamond dresser point 874 arranged to be swung into and out of position to dress a grinding wheel mounted on wheel spindle 224. The shaft 870 carries a pinion 876 which meshes with a rack 878 formed on a piston 880. The piston 880 is slidably mounted in a bore 882 formed in the body 866. A similar piston 884 has a rack also meshing with pinion 876 and slides in a cylinder bore 886. The end cap 894 carries a second cylinder 896 having a stepped bore for the reception of a differential area piston 898. The bore is vented at 899. The piston 898 has a stem 900 which is in abutment with piston 880, the space to the left of piston 898 in the small diameter cylinder being connected freely to the end of cylinder 882 through passages 902. A passage 904 in the end cap 892 serves to connect to a source of fluid through passages in the work carriage later to be described.

Referring now to FIGURE 27, the construction of the work holding spindle 268 which is mounted on the rear of the work carriage is there illustrated. The spindle may comprise a main body casting 906 having a central bore 908 in which a pair of anti-friction bearings 910 journal a main spindle tube 912. The spindle 912 carries at its outer end a collet 914 having a conical inner bore 916 for receiving the collet jaws 918. These collet jaws may be formed as plates separated by alternate segments of rubber bonded thereto and have a groove 920 in engagement with a flange 922 on a collet control sleeve 924. The sleeve 924 is threaded into the end of a collet actuator tube 926 which slides within the spindle tube 912 and carries an anti-friction bearing 928 at its rear end. This is coupled through a balancing piston 930 to a rear sleeve 932 which has a piston 934 formed on its right-hand end. The piston 934 is hydraulically reciprocable in a cylinder 936 which has connections 938 and 940 to its opposite ends. The connection 938 may be coupled to the mechanico-hydraulic control unit and the connection 940 ot the return oil accumulator.

The body 942 which contains the cylinder 936 is secured to a sleeve 944 which is mounted on anti-friction bearings 946, within the right-hand end of the spindle 912. Thus, the body 942 and sleeve 944 may be stationary, while the spindle rotates. Secured to the right end of cylinder 936 is an ejector cylinder 948, the left-hand end of which communicates with return oil connection 940 while the right-hand end is closed by an end cap 950 having an operating connection 952 therein. A piston 954 is slidable in the cylinder 948 and has a rod 956 extending with a sliding seal through the pistons 934 and 930 and terminating in a ball bearing swivel assembly 958 which connects with an ejector rod 960. Suitable passages 962 provide for the supply of lubricant to the anti-friction bearings.

*Mechanico-hydraulic system*

As illustrated in FIGURE 1, the rear part of the main base 202 carries a mechanico-hydraulic power and control unit 306. This unit comprises in general a gear box 963 with automatic cam control arranged to drive a single cam shaft upon which a plurality of cams are mounted in spaced relation at a slow speed during part of a revolution and at a high speed during another part of the revolution.

Figure 30:
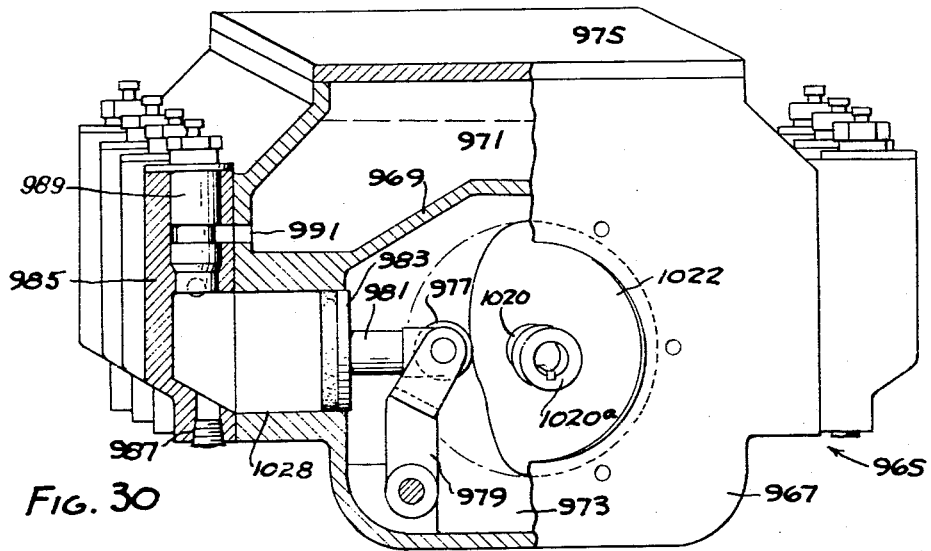
FIGURE 30 is a view, partly in section on line 30—30 of FIGURE 33 showing the cyclic control mechanism.

The cams are carried in a cam box 965 illustrated in FIGURE 30. This may comprise a generally rectangular housing 967 having a horizontal partition 969 to form an upper reservoir chamber 971 and a lower cam case 973. A cover 975 closes the upper reservoir. Journaled on bearings, not shown, at the far end of the housing is a cam shaft 1020 which is driven from the multi-speed gear box and carries a plurality of disc cams 1022. Each cam has a roller follower 977 which is oscillatable on a bifurcated rocker arm 979 and has a bifurcated piston rod 981 carrying, rigidly secured thereto, a piston 983. The piston is reciprocable in a cylinder 1028. The end of each cylinder 1028 is closed by a head and valve member 985 which has a hydraulic connection 987 at its lower portion and a combined relief valve and concentric replenishing valve assembly 989 in its upper portion. The relief valve in the assembly 989 permits flow from the cylinder 1028 to the reservoir 971 through passage 991 whenever the pressure in cylinder 1028 is above a predetermined setting. The replenishing valve permits flow out of the reservoir 971 to the cylinder 1028 whenever pressure in the latter is below the pressure in the reservoir 971. The reservoir pressure is preferably maintained at a value somewhat above atmospheric pressure by a confined body of air in the upper portion of reservoir 971. It will be understood that the cam box 965 contains a plurality of cam and cylinder sections which are alternately positioned at the left, as shown, and at the right-hand side of the cam shaft 1020.

Figure 29:
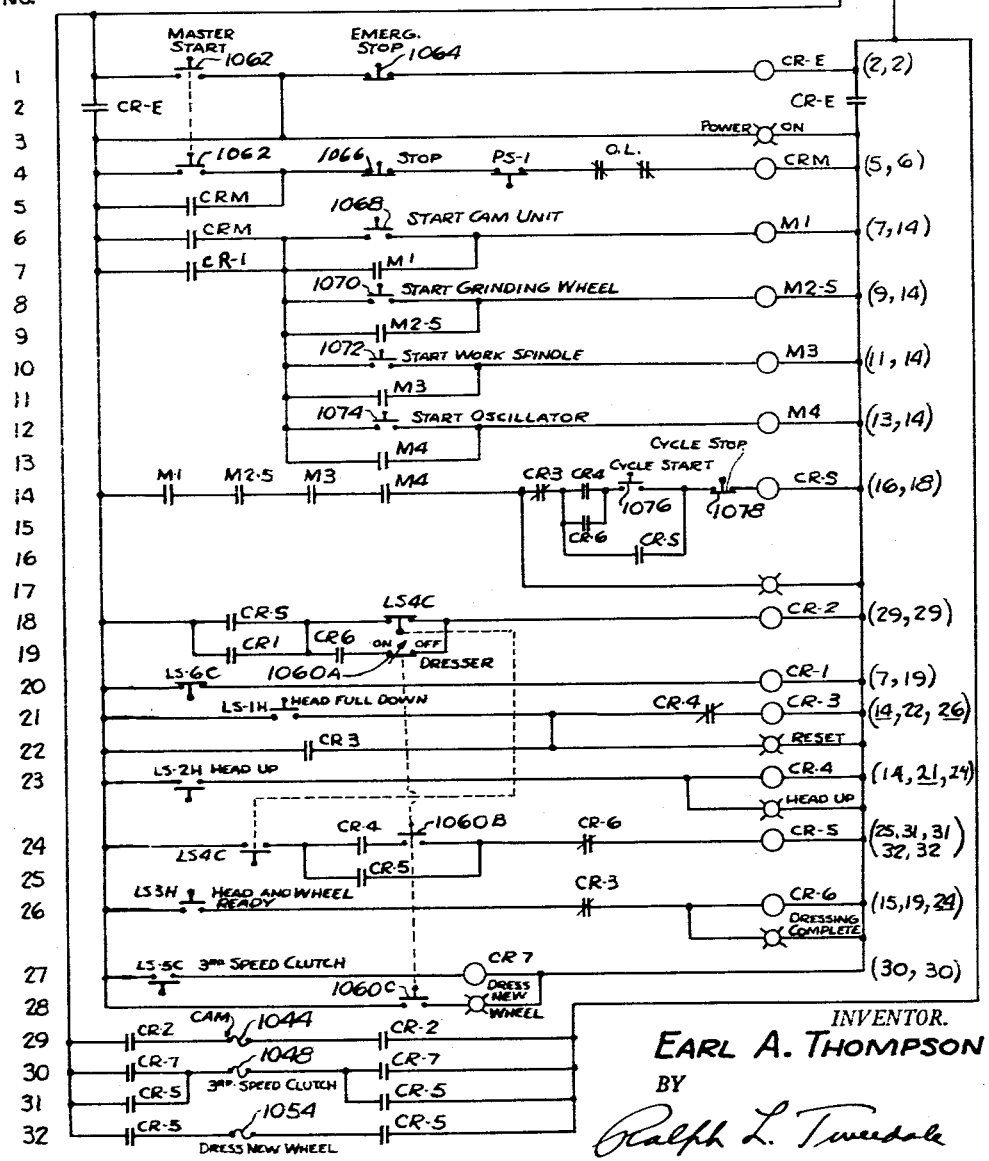
FIGURE 29 is an electric circuit diagram showing the electrical portion of the cyclic control mechanism.

The gear box 963 has in input shaft 993 driven by a belt and pulley arrangement 995 from an electric motor M-1, which may be mounted on top of the casing 963, and which is shown in the electric diagram FIGURE 29. The gear box includes a housing 997 with a cover 999 and it forms an oil reservoir at its lower portion. The input shaft 993 has keyed thereto a pinion 1001, and at its right-hand end carries the driving plates of a multiple disc clutch 1003. A worm shaft 1005 is journaled on bearings 1007 and carries a worm 1009 meshing with a worm wheel 1011 keyed to the cam shaft 1020. The shaft 1020 is preferably formed in two sections, joined at the coupling 1020a. The driven plates of the clutch 1003 are slidably keyed to a hydraulic piston 1013 which is slidably keyed to the worm shaft 1005 and is slidable in a cylinder 1015 stationarily mounted. Fluid pressure in the cylinder 1015 engages the clutch so as to connect worm shaft 1005 directly with input shaft 993 for high speed rotation of cam shaft 1020.

For slower speed operation of the cam shaft, a countershaft 1017 is journaled in the housing 997 and driven from pinion 1001 by gear 1019 through an idler 1021. The countershaft 1017 extends into a third-speed gear box 964, later to be described, and which couples the countershaft 1017 to a stub shaft 1023 for rotation at reduced feeding speeds. The shaft 1023 has a hydraulically engaged clutch 1025 similar in construction to the clutch 1003, serving to couple the worm shaft 1005 to the stub shaft 1023. A hydraulically operated brake band 1027, which may be applied by a hydraulic cylinder 1029, engages the piston 1013 to lock the worm shaft 1005 by fluid pressure admitted to the cylinder 1029.

Figure 31:
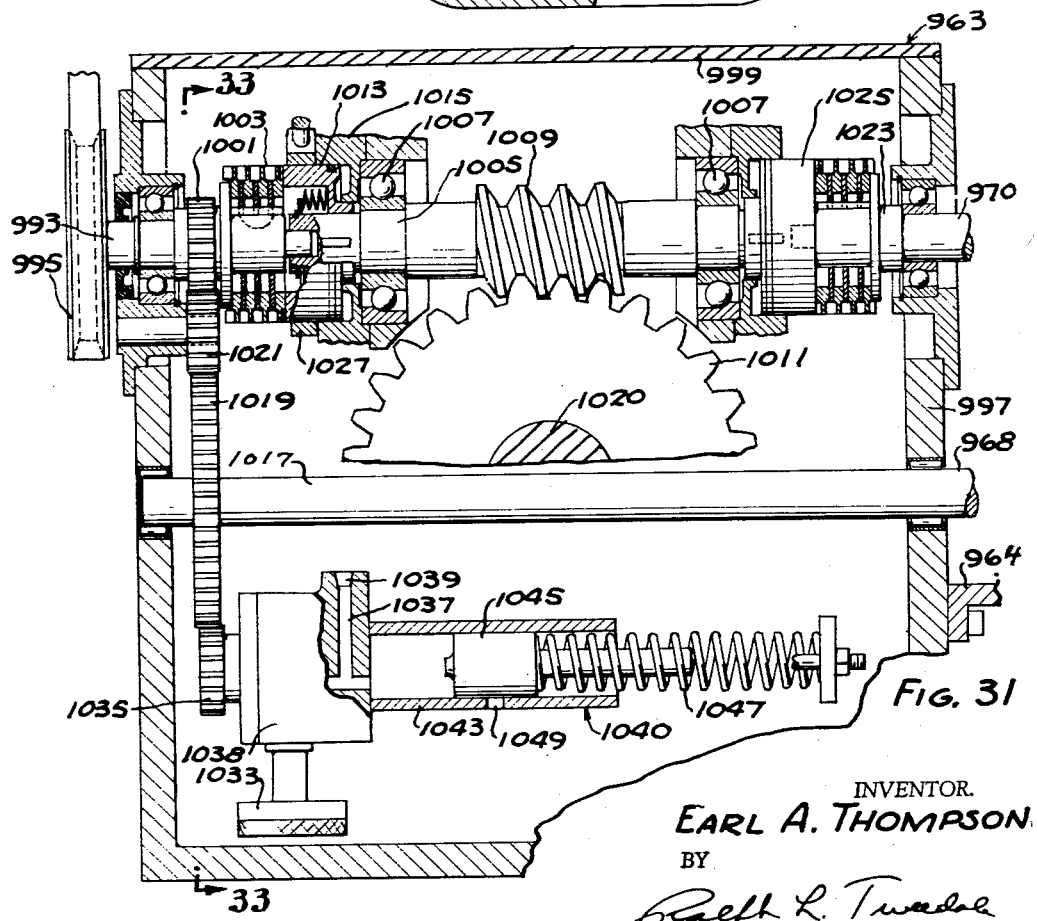
FIGURE 31 is a sectional view on line 31—31 of FIGURE 33 showing a portion of the cyclic control mechanism.

The gear box 963 may also include a hydraulic pump and valve system for controlling the clutches 1003 and 1025 and the brake 1027. This may comprise a pump 1038 having a filtered intake conduit 1033 and a drive shaft gear 1035 meshing with gear 1019, FIGURE 33. The pump has a delivery conduit 1037 leading to a connection 1039 and also communicating with a combined accumulator and relief valve 1040. This may comprise a cylinder 1043 having a piston 1045 which is biased to the left, FIGURE 31, by a spring 1047. A spillover port 1049 serves as a relief valve when the accumulator is filled.

Figure 32:
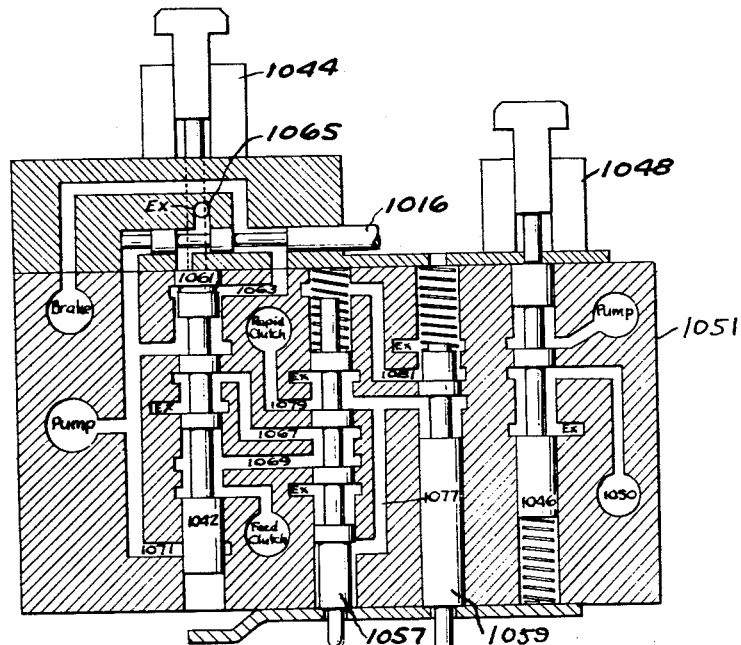
FIGURE 32 is a diagram of a hydraulic valve system forming part of the cyclic control mechanism.
Figure 33:
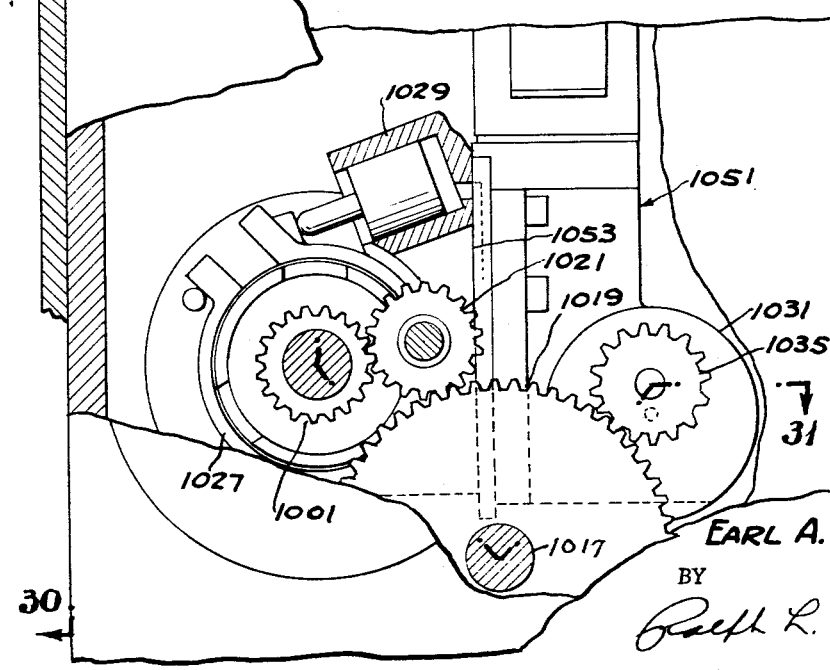
FIGURE 33 is a sectional view taken on line 33—33 of FIGURE 31.

Mounted in the gear box 963 is a control valve assembly 1051 which may be formed integrally with the body of pump 1038 and secured to the flat surface 1053, FIGURE 33, of the bodies of the clutch cylinders 1015 and 1025 and of the brake cylinder 1029. The valve system is shown diagrammatically in FIGURE 32 and includes a start-stop valve 1042, a self-holding rapid speed valve 1057, a reset valve 1059 for valve 1057 and an auxiliary valve 1046. The start-stop valve 1042 may be shifted downwardly to a mid position by a solenoid 1044. When in this position, the enlarged head 1061 passes below the port 1063 to cut off pump pressure from the brake cylinder and to exhaust the same through port 1065. The valve 1042 in mid-position also cuts off a passage 1067 from exhaust and connects it to pump pressure. With valve 1057 in its lower position, as shown, passage 1067 feeds pump pressure to the feed clutch 1025 through a cross-passage 1069. If the manual valve 1016 is pulled to the right in FIGURE 32, the top end of spool 1042 is connected to pump pressure to force the valve down to the lower limit of its stroke, cutting off passage 1069 from the feed clutch and connecting pump pressure directly to the feed clutch from the port 1071.

Figure 18:
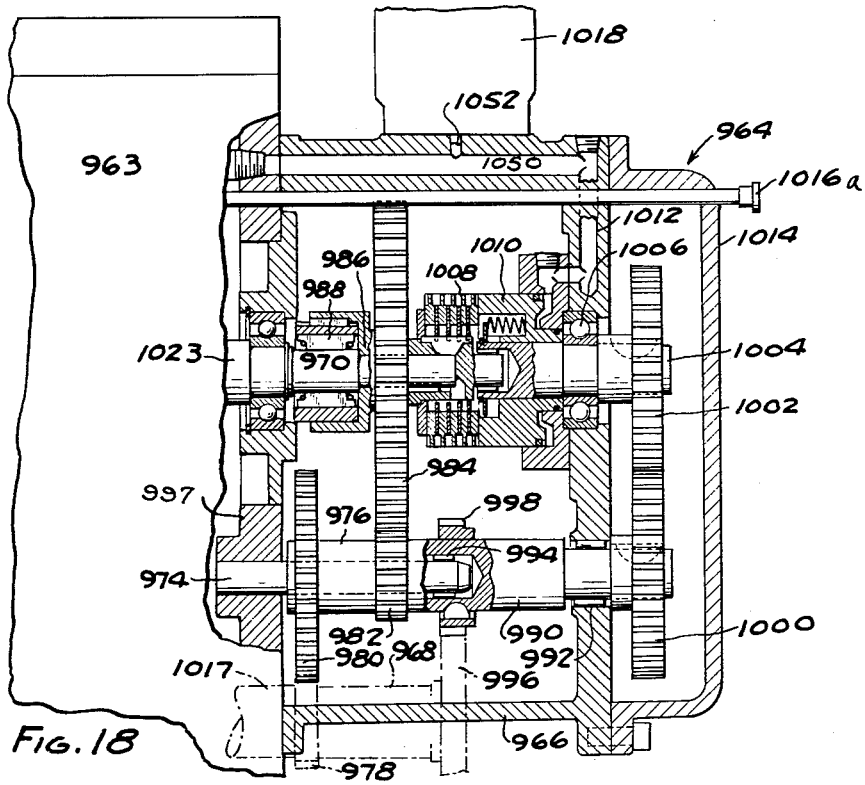
FIGURE 18 is a cross section taken on line 18—18 of FIGURE 17.
Figure 17:
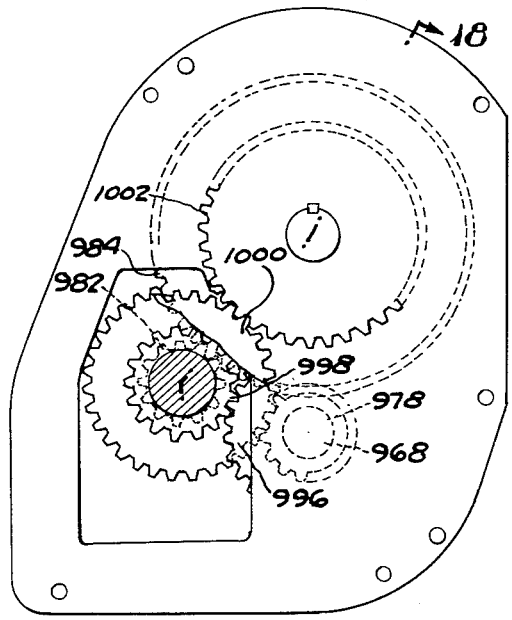
FIGURE 17 is an end view of a gear box associated with the control mechanism of the grinder illustrated in FIGURE 1.

The cam shaft 1020 is provided with a pair of adjustable valve tripping cams 1073 and 1075 which control the valves 1057 and 1059, respectively. At a predetermined point in the rotation of cam shaft 1020, cam 1073 will lift valve 1057, which holds itself in raised position, by pressure admitted from passage 1067 through passage 1077 to the lower end of the valve. This pressure is also admitted through passage 1079 to the rapid clutch cylinder 1015. At the same time, the feed clutch is connected to exhaust through passage 1069. When the cam shaft has turned a further distance, the cam 1075 will lift valve 1059 which connects together the top and bottom ends of valve 1057 through passages 1077 and 1081. Valve 1057 then falls, or resets, disengaging the rapid clutch and re-energizing the feed clutch. The auxiliary valve 1046 serves, when lowered by the solenoid 1048, to switch the auxiliary line 1050 from exhaust to pump pressure for the purpose of energizing the third-speed clutch about to be described and contained in a third-speed gear box 964 which is shown in detail in FIGURES 17 and 18. This unit may comprise a housing section 966 which may be mounted on the side of the gear box 963 around the extending ends 968 and 970 of countershaft 1017 and stub shaft 1023, respectively. The housing 997 of gear box 963 carries a trunnion shaft 974 upon which is mounted a low speed sleeve 976. A pinion 978 keyed to countershaft 1017 meshes with a gear 980 fast on the sleeve 976. Also fast on the sleeve 976 is a pinion 982 meshing with a driven gear 984 carried fast on a rotatable sleeve 986 which is journaled on the extension 970 of the stub shaft 1023. A sprag or one-way clutch device 988 serves to couple the sleeve 986 to the shaft 970 for slow speed drive from the input shaft 968 through the gearing just described.

For the purpose of providing an intermediate speed to the shaft 970, a second countershaft 990 is journaled in bearing 992 in the housing 966 and by means of bearing 994 upon the stationary trunnion shaft 974. A gear 996 upon shaft end 968 drives a gear 998 fast upon countershaft 990. At the outside of the housing 966, the countershaft 990 has fast therein a gear 1000 which meshes with a driven gear 1002 which is fast on a shaft 1004 which is journaled in the housing on bearing 1006. Shaft 1004 connects with the driving element of a hydraulically actuated multiple disc clutch 1008 which is controlled by a hydraulic piston 1010. The latter may be supplied with operating oil through a conduit 1012 formed in the housing 966.

The driven element of clutch 1008 is keyed to the end 970 of shaft 1023. Since the speed ratio of the various gears just described is such that the driving element of the clutch is rotated at a faster speed than the shaft 970 when driven through the low speed gearing, it will be apparent that with the clutch 1008 disengaged, the shaft 970–1023 will be driven at low speed by action of the one-way clutch 988. If, however, clutch 1008 is engaged, then shaft 970–1023 is driven at a faster rate and the one-way clutch 988 disengages to permit such overrunning to take place. A cover plate 1014 is applied to the right-hand end of the housing 966 to enclose the gearing 1000–1002.

A control knob $1016_a$ extends from inside the transmission case of the mechanico-hydraulic unit for the purpose of manually operating valve 1016, FIGURE 32, to hold the gearing in low speed. For the purpose of controlling the supply of oil to certain hydraulic motors while the camshaft is stationary, a suitable solenoid operated three-way valve 1018 is mounted on the top surface of the housing section 966. A passage 1050 is formed in the housing 966 and serves to connect auxiliary valve 1046, FIGURE 32, with passage 1012 for the third-speed clutch and with the three-way valve 1018.

The return biasing force for the various hydraulic motor pistons of the grinder is provided by the return oil accumulator 398 mounted in base 202. This may be of any conventional form for providing a source of fluid of a constant pressure and is preferably maintained by a body of elastic gas such as air. The return oil accumulator is connected by conduits, some of which are not illustrated, to the appropriate cylinder areas where return oil is required, all of these areas being in free communication with the accumulator and with each other without the interposition of any valve. For this purpose a large diameter manifold pipe 1083, FIGURE 2, extends to the oscillator 286 and has branches, not shown, leading to the points of utilization.

Figure 28:
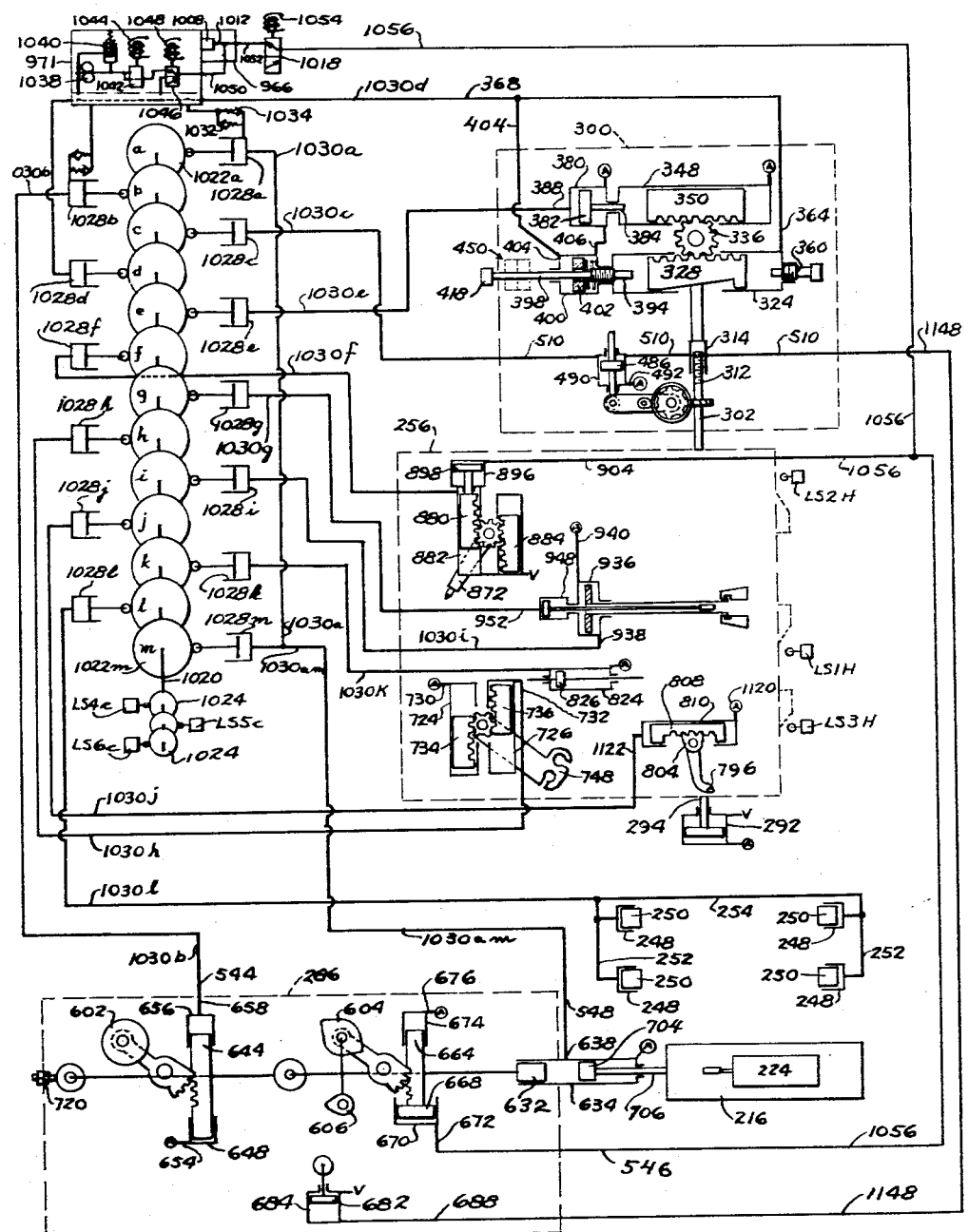
FIGURE 28 is a hydraulic circuit diagram showing the cyclic control mechanism for operating the cams and other parts of the machine.

The arrangement of the mechanico-hydraulic drive and control unit with the various cylinder and piston portions of the machine is illustrated in the hydraulic circuit diagram of FIGURE 28, where the main cam shaft is indicated at 1020 as carrying a plurality of rotary cams 1022, the number in the present embodiment being thirteen such cams. The cam shaft also carries a plurality of electrical cams 1024 at its opposite end and these may control the cam switches LS–4C, LS–5C, and LS–6C.

Each of the cams 1022 is arranged to operate an individual hydraulic pulsator comprising the transmitter piston and cylinder assembly 1028 which is connected by a closed line 1030 with the appropriate receiver cylinder formed by one of the hydraulic actuating mechanisms of the grinder. These pulsator circuits are identified with individual letter subscripts, a through m, as are their associated actuating cams and pulsator conduits. Thus the conduit $1030_a$ is connected to the cylinder 634 for advancing and retracting the wheel carriage. It will be noted that the conduit $1030_m$ joins with the conduit $1030_a$ so that the two transmitters $1028_a$ and $1028_m$ are connected in parallel and their outputs are additive.

Conduit $1030_b$ is connected to the port 658 of the cylinder 656 which disengages the oscillator cam 602. Conduit $1030_c$ connects with the port 510 of cylinder 490 for advancing the work carriage feed pawl. Conduit $1030_d$ is branched by means of passage 404 and connects to both cylinder 400 and port 364 of cylinder 324 for controlling the feed wedge piston 328. The conduit $1030_e$ connects with port 388 of the cylinder 380 to advance the rough grind stop 384. The conduit $1030_f$ conects with the cylinder 882 to advance the piston 880 of the wheel dresser arm. The conduit $1030_g$ connects with the port 952 of cylinder 948 to advance the work ejector. The conduit $1030_h$ connects with the port 732 of cylinder 726 to control shifting of the loader arm. The conduit $1030_i$ connects with port 938 of cylinder 936 to control closing of the work spindle collet. The conduit $1030_j$ connects with the end of cylinder 810 to control the piston 808 for the loader lever. The conduit $1030_k$ connects with the end of cylinder 824 to control the piston 826 of the gaging mechanism. The conduit $1030_l$ conects with conduits 252 and 254 of the work carriage clamping cylinders.

As seen in FIGURE 28, the ends of the operating cylinders which are opposite to a liquid column conduit are indicated by the circles labelled A as being connected to the manifold 1083, FIGURE 2, of the accumulator 398 for return oil. Each of the pulsator circuits is provided with an individual pair of replenishing and relief valves 1032 and 1034, respectively, which connect with the oil reservoir 971 in the main casing of the unit. The reservoir is preferably lightly pressurized with air pressure. Each of the operating cylinders has a smaller displacement than its corresponding transmitter and this extra displacement is expelled to the reservoir at the end of each advancing stroke and is drawn in again, along with make-up fluid for any leakage loss, at the end of the retraction stroke of the transmitter.

In addition to the passages shown in FIGURE 32, the delivery conduit of pump 1038 feeds the auxiliary three-way valve 1046 controlled by solenoid 1048 so as to selectively connect the conduit 1050, FIGURE 28, either with pump delivery or reservoir. The conduit 1050 leads to the passage 1012 in the third-speed gear box 966, which controls the hydraulically actuated clutch 1008. A branch 1052 leads to the three-way valve 1018, FIGURE 18, which is controlled by solenoid 1054 to selectively make or break a hydraulic connection between the branch 1052 and a conduit 1056. The latter has a branch leading to the port 904 of cylinder 896 for the wheel dresser arm and a second branch leading to the port 672 of the cylinder 670 for engaging the oscillator cam 604 and the special feed pump cam 606. The wheel dresser arm 872 and the cams 604 and 606 are utilized when it is desired to automatically dress a new wheel without conducting the normal grinding cycle and thus the cam shaft 1020 is stopped, although the pump 1038 remains in operation.

As the parts are diagramed in FIGURE 28, those contained in the feed box are enclosed by the dotted line 300; those mounted on the work carriage are enclosed in the dotted line 256; and those in the oscillator box are enclosed by a dotted line 286. The remaining parts are mounted on the frame 206—226. There is also shown in this figure a series of limit switches which are operated as the work carriage reaches certain positions. Thus, LS–1H is operated when the carriage reaches a predetermined lower limit of its travel; LS–2H is operated when it reaches the upper limit of its travel; and LS–3H is operated as the head descends a predetermined amount.

Portions of the hydraulic circuits are contained within the work carriage 256. Thus, as seen in FIGURE 22, the counterweight 278 contains a return oil passage 1100 which has a terminal connection 1102 in the bottom face of the counterweight which may be connected to the manifold 1083 by suitable piping and hose. The passage 1100 is preferably formed as an open face core on the rear side of the counterweight 278 and is closed when the counterweight is attached to the main work carriage 258. An angular drilled passage 1106 may be formed in the carriage 258 to connect between the core 1100 and the right-hand end of carriage 258 where it lines up with passage 730 in the body 728 of the work loader arm.

In a similar manner passage 1108 with terminal 1110 and drilled passage 1112 leads to the right face of carriage 258 at a point, see FIGURE 20, adjacent the axis of shaft 744 where it connects with a passage 114 in the shaft 744. The latter connects by means of an annular groove 1116 with a passage 1118 in the body of the loader arm 748, which in turn leads to a connection 1120 in the end cap 814. Return oil is led from the manifold 1083 by a hose 1122 to a central passage 1124 in the opposite end of shaft 744 from whence by a similar groove and body passage connection, not shown, is established with the left end of cylinder 810 for the loader lever.

The work carriage includes a similar cored passage 1126, terminal 1128, and drilling 1130, which, as shown particularly in FIGURE 23, extends to the rear face of the main carriage body 258 and through a sub-plate 1132 to plate 262 where the end 1134 connects with passage 888 in the body 866 of the dresser arm. Also a cored passage 1136, terminal 1138, and drilled passage 1140 provide communication to the right-hand face of the carriage at a position to line up with the passage 732 in the work loader body 728, see FIGURE 19.

The gaging cylinder 824 is connected by a hole 1142 with the return oil passage 1100 and by a similar hole 1144 with a terminal port 1146 in the lower face of the counterweight. On the sub-plate 1132 adjacent the face of plate 262 is a cored passage 1148 having hose connection terminal 1150 in the hollow back of the main carriage 258 for the purpose of supplying auxiliary pump oil from the conduit 1056, FIGURE 28, to the passage 904, FIGURE 19, for the auxiliary operating cylinder 896 of the dresser arm assembly. Referring again to FIGURES 22 and 23, the left-hand end of the counterweight is provided with a pair of passages 1152 and 1154, the terminals 1156 and 1157 of which open to the bottom of the counterweight. These passages lead through the carriage 258 to hose terminals 1158 and 1160, FIGURE 21, adjacent the work spindle 268. Also in the rear face of plate 262 there is provided a branch terminal 1162, FIGURE 21, of the return oil conduit 1106. The terminals 1158, 1160, and 1162 are connected by hoses, not shown, with the terminals 952, 938 and 940, respectively, of the work spindle assembly. The return oil passage 1106 has a branch 1164, FIGURE 22, leading into the plate 262 and ending at the terminal 1162 with a branched passage 1166, FIGURE 19, registering with the passage 890 in the body 866 of the dresser arm assembly.

Since the loader arm and lever, the dresser arm assembly, the gaging cylinder and the work spindle assembly are all mounted on the work carriage, which is a movable member, the combination of internal passage ways in the carriage, together with flexible hoses, are provided for conveniently establishing the necessary hydraulic connections to these units. In the case of the remaining hydraulic cylinders shown in the circuit diagram of FIGURE 28, these are all mounted stationarily on the frame of the machine and may be connected by piping which may be of any suitable configuration not shown.

Electric circuit

The grinder is motivated by five electric motors, M-1 being connected to drive the mechanico-hydraulic unit 306, M-2 being connected to drive the pump, not shown, for the turbine of the wheel spindle 224, M-3 being connected to drive the work spindle, M-4 being connected to drive the wheel carriage oscillator, and M-5 being connected to drive the coolant circulating unit not illustrated. The motors are conventionally connected in a three-phase supply circuit as indicated in the upper part of FIGURE 29, a control transformer 1058 being connected across one phase and supplying the various control circuits indicated in the remainder of FIGURE 29. The elements of the circuit and their connecting conductors are readily identifiable without detailed description of the construction and will be referred to hereafter in describing the operation of the machine. The symbols C—R, followed by a letter or number, each designate the coil of a control relay, indicated by a circle, and the parallel lines carrying C—R symbols indicate the contacts controlled thereby. At the left margin of the lower or "across-the-line" portion of the diagram, the horizontal lines are numbered and at the right the numbers in parenthesis show the line numbers where the contacts for each relay coil are located and show by an underlining those contacts which are normally closed. The designations M-1, M-2, etc., in the lower part of the diagram designate by circles the actuating coils of the respective motor starters and by the short parallel vertical lines the holding contacts for each. The switches designated L-S, followed by numbers and letters, are the contacts of certain limit switches which are arranged to be actuated by various moving parts of the machine. Thus, LS-1H, LS-2H and LS-3H are the limit switches actuated by the work carriage or head 256 and LS-4C, LS-5C and LS-6C are the limit switches actuated by the cams 1024 of the mechanico-hydraulic unit 306.

A pressure switch PS-1 is shown as normally open and is arranged to be held closed as long as the return oil pressure in accumulator 308 is above its minimum safe value. Suitable circuit overload devices are indicated at O. L.

Operation

The mechanism described is well adapted to perform production grinding operations in a sequence which, besides the mechanical handling of pieces in and out of the work spindle chuck, performs a first rough grinding operation, after which the wheel is withdrawn and dressed, and then a final finish grinding and sparkout is performed. During the progress of repeated grinding operations of this sort, the wheel is progressively dressed down until it is no longer suitable and needs replacement. The apparatus disclosed includes an automatic cyclic control for producing an initial dressing operation of a new wheel automatically so that dressing may be performed with dispatch and normal grinding cycles quickly resumed.

In the ensuing statement of operation, such a machine cycle is described, starting with the operation of dressing a new wheel and then proceeding to normal grinding cycles. With the fluid reservoirs all filled and the electric circuit connections established to a suitable line, the machine may be considered to have come to rest by reason of the work carriage reaching a lower limit of motion, dictated by the maximum permissible wear on the grinding wheel on the spindle 224, causing LS-1H of FIGURE 29 to close, thus energizing control relay CR-3 in line 21 of FIGURE 29. The normally closed contacts of CR-3 in line 14 are thus opened to deenergize relay CR-S of line 14. Closure of LS-1H also energizes a signal light designated "reset head."

The dropping out of relay CR-S does not, however, stop the mechanico-hydraulic unit 306 until the latter has turned to a predetermined stopping position which is determined by cam operated limit switch LS-6C in line 20. When these normally closed contacts are opened, relay CR-1 is deenergized, the normally opened contacts of which in line 19 deenergize relay CR-2, since CR-S has previously been opened. This deenergizes the cam solenoid 1044 in line 29, thus interrupting the drive of cam shaft 1020. The reset signal light warns the operator to replace the wheel and for this purpose the various drive motors are stopped by pushing the stop switch 1066 in line 4 to deenergize relay CR-M. This interrupts the circuit to the various motor holding relays M-1 to M-4 in lines 6 through 12, since CR-1 is already opened at this time.

With the machine thus brought completely to rest, the operator may manually raise the work carriage 256 by operation of the handcrank 470, FIGURE 8, which through the worm 464 and wheel 456 threads the shaft 312 upwardly in the nut 314 permitting the return oil pressure in the counterbalance cylinder 292 to raise the work carriage. This opens LS–1H in line 21 but the reset signal and relay CR–3 remain energized through contacts CR–3 in line 22. When the head has been raised to its upper limit in this manner, LS–2H is closed, which through its contacts in line 23 energizes the control relay CR–4 and the "head-up" signal light. This, through opening of the normally closed contacts in line 21, deenergizes relay CR–3. The latter in turn deenergizes the reset signal and sets up certain preparatory circuit connections for relay CR–S in line 14 and for relay CR–6 in line 26. Relay CR–4 also, when it picked up, established a preparatory circuit connection, line 24, for relay CR–5.

When the operator has removed the worn wheel from the spindle 224 and replaced it with a new one, the machine is ready for the start of an automatic cycle of operation for dressing the wheel. This cycle is initiated by manual operation of the dresser switch 1060$_a$, $_b$ and $_c$ in lines 19, 24, and 28. The contacts 1060$_b$ establish a preparatory circuit for relay CR–5 and the contacts 1060$_c$ energize the "dress-new-wheel" signal, indicating that the machine is set for a dressing cycle rather than a grinding cycle. Operation of the motors and the carriages to perform a dressing cycle may be initiated by first manually closing the master start switch 1062 in line 4 which energizes master relay CR–M. The motors M–1, etc., may be in turn energized by closing their respective starting switches 1068–1074 in lines 6 through 12 thus bringing the motors into operation for driving the grinding wheel, the coolant pump, spindle, oscillator box and the mechanical hydraulic control unit. Closure of the relays M–1, etc., in lines 6 through 12, also closes a set of series contacts in line 14 to establish a preparatory circuit for control relay CR–S.

A cycle will be initiated by closure of the cycle start switch 1076 in line 14 which completes the circuit to relay CR–S. This relay in turn, through its normally open contacts in line 18, completes the circuit to relay CR–2 through the normally closed limit switch LS4–C in the mechanico-hydraulic unit. Control relay CR–2, through its contacts in line 29, energizes the cam solenoid 1044 to cause actuation of the cam shaft 1020. This moves only through a small angle, however, sufficient to advance the wheel carriage up to a position where the wheel is underneath the dresser arm ready to be oscillated back and forth for dressing purposes as will be described later. In moving away from its normal stopping position, camshaft 1020 restores LS–6C to its normally closed condition, which energizes relay CR–1. The CR–1 contacts in line 7 then parallel the CR–M contacts in line 6. The CR–1 contacts in line 19 establish a preparatory circuit for relay CR–2.

As soon as the cam shaft has moved through this distance, the limit switch LS–4C opens its normally closed contacts in line 18 and deenergizes relay CR–2 to stop the cam by deenergizing solenoid 1044. The closure of the normally open contacts of LS–4C in line 24 energizes relay CR–5, closing its holding contacts in line 25.

The normally open contacts in lines 31 and 32 close to energize the three-speed clutch solenoid 1048 and the dress-new-wheel solenoid 1054. The former solenoid admits auxiliary pump oil from line 1050 to the third-speed clutch 1008 (although the cam shaft is stationary and no action results) and to the branch 1052, from which three-way valve 1018, which is now shifted, feeds oil to the conduit 1056. One branch of this conduit leads to the dresser arm cylinder 1096 for shifting the dresser arm into operative position. The other branch of the conduit 1056 leads to the engaging cylinder 670 in the oscillator box 286 and causes the engagement of cams 604 and 606 with their respective followers.

Since the drive motor is rotating the input shaft and the cams in the oscillator box, the cam 604 causes a vibratory motion of the piston 632 which is transmitted through the trapped body of oil in cylinder 634 to piston 704 which is mechanically connected by rod 706 to the wheel carriage. The wheel is thus caused to partake of repeated reciprocating motions determined by the shape of the cam 604 which is so designed to feed the wheel back and forth under the dresser. At each reciprocation of the wheel carriage, the cam 606 operates the piston 682 to transmit a predetermined volume of oil from the port 688 to the port 510 in the feed box 300 (see FIGURE 9). This gives an increment of rotation to the plate 478 which is determined by the adjustment of stop nut 496, coacting with pin 506. The pawl 476 drives the rotor 474 on the shaft 462 which causes an increment of projection of plunger 302 downwardly out of the feed box by threading it out of the nut 314. On the return stroke of the piston 682 the return oil retracts the piston 486 and pawl 476 freely slides over the surface of rotor 474. At the first lowering of the carriage 256, limit switch LS–2H is opened, which deenergizes the "head-up" signal and also the relay CR–4 through its contacts in line 23. The normally closed contacts of CR–4 in line 21 thus establish a preparatory circuit for the relay CR–3.

As a result of this repeated incremental lowering of the carriage 256, the dresser arm progressively dresses the wheel until a point is reached where it is ready for grinding operations. At this point limit switch LS–3H in line 26 closes to energize relay CR–6 and the signal indicating "dressing complete." Relay CR–6 through its contacts in line 15 closes a preparatory circuit for relay CR–S, while the contacts in line 19 close a preparatory circuit for relay CR–2. The normally closed contacts in line 24 deenergize relay CR–5. The contacts of relay CR–5 in lines 31 and 32 stop the oscillation of the wheel carriage 224 by deenergizing solenoids 1048 and 1054. These allow the three-way valves 1046 and 1018 to shift, thus exhausting the oil from cylinder 670 and permitting return oil in cylinder 674 to disengage the cams 604 and 606. The dressing operation is thus stopped with the electric motors remaining in operation and the work carriage in a position ready to commence grinding operations.

When the operator notices the "dressing complete" signal light, he may turn the dresser switch 1060 to the off position, which alone is sufficient to initiate automatic repeated grinding cycles of the entire machine. This comes about by reason of the dresser contacts in line 19 which energize control relay CR–2, all three of the relays CR–1, CR–6 and CR–S in lines 18 and 19 having been previously closed. The dresser switch contacts 1060$_c$ in line 28 deenergize the "dress-new-wheel" signal light. The energization of relay CR–2 energizes the cam solenoid 1044 through the contacts in line 29 which starts the cam shaft 1020 in operation. The cam shaft starts at the point to which the wheel carriage had been advanced for wheel dressing operation. As soon as it moves away from this point, LS–4C resumes its normal position, as shown in lines 18 and 24.

With a stack of cylindrical work pieces positioned in the loading chute 754, and with the loader arm 748 having been brought to rest in the dotted line position shown in FIGURE 19, the loader lever 798 is operated by piston 808, rack 804 and shaft 800. Through the connection of the pin 796 with the slot 722 in the work piece shuttle actuator 768, the motion of loader lever 798 causes the bar 764 to push the lowermost work piece in the stack to the right in FIGURE 22 and into the pocket 788 of the loader arm. This action will normally be preceded by an opposite stroke of the loader lever 798 and shuttle assembly during which the pin 772 moves to eject a finished work piece from the other pocket 790. The loader arm is thus equipped with a new work piece in the pocket 788 and the pocket 790 is emptied so that the arm is in readiness to empty and reload the work spindle at a later point in the cycle. Assuming that from the previous automatic operation of the machine, a work piece has been inserted in the spindle collet 918 and that the jaws have been closed and the ejector retracted by return oil acting on their respective pistons, then the cam $1022_b$ next withdraws its transmitter piston so as to permit the receiver piston 644 to be pushed upwardly by return oil pressure in cylinder 648. This engages the oscillator cam 602 with its follower in the oscillator box 286. The piston 632 is accordingly driven with a vibratory motion which is transmitted through the trapped oil in cylinder 634 to the piston 704 and the wheel spindle carriage 216. During this operation the cams $1002_a$ and $_m$ hold their transmitter pistons stationary so that there is no motion of the oil in line $1030_{a-m}$.

The work carriage is caused to be fed downwardly by operation of the feed box wedge piston 328 to the right in FIGURE 28. For this purpose cam $1022_d$ retracts its transmitter to permit return oil acting on piston 350 to propel the piston 328 to the right. Prior to this, however, the rough grind stop 384 is projected to the right by the action of cam $1022_e$ transmitting oil to line $1030_e$ to the cylinder 380. The motion of wedge piston 328 forces the feed bar 302 downwardly to move the carriage 256 rapidly to the point determined by the rough grind stop 384. The grinding wheel thus grinds the internal surface of the work piece while the wheel carriage is oscillated and the work spindle is revolved.

After an interval of this the cam $1022_b$ projects its transmitter piston to deliver oil to receiver piston 654 and disengages the oscillator cam 602. As soon as this happens the return oil acting in the right-hand end of cylinder 634 assures that the piston 632 will be maintained at its extreme left end of movement determined by the stop 720 in the oscillator box. Concurrently with the disengagement of the oscillator the parts are prepared for a wheel dressing operation. Thus the cam $1022_c$ projects its transmitter piston to deliver oil to the piston 486 of the feed box for the purpose of introducing an increment of downward feed through the screw 312 and nut 314. Also the cam $1022_f$ projects its transmitter piston to deliver oil to the top of piston 880 for swinging the dressing arm into position.

Simultaneously with these actions the work carriage 256 is retracted by operation of the wedge piston 328. This occurs by reason of cam $1022_d$ delivering oil to the right end of cylinder 324 to propel the piston 328 all the way against the adjustable stop 394 overcoming the return oil pressure on the right-hand end of piston 350. The cams $1022_a$ and $1022_m$, or one of them, at this time cause one or more oscillations of the wheel carriage 216 for the purpose of passing the wheel along the dresser arm and returning it to working position. This is preferably a very light, single dressing cut which assures that the finish grinding operation on each individual work piece starts with a freshly dressed wheel surface which has been dressed to a fixed dimension with respect to the work carriage. During the dressing operation the cam $1022_c$ may withdraw its transmitter to permit retraction of the piston 486 of the screw feed mechanism.

The next three operations may occur concurrently. The dresser is raised by retraction under the control of cam $1022_f$ and the oscillator is engaged by retraction under control of cam $1022_b$. Also the work carriage 256 is fed downwardly, as previously described, by motion of the plunger 328 to the right. This first moves as far as the rough grind stop 384 allows, although at this point the wheel has been dressed off slightly so that grinding does not immediately commence. Thereupon the rough grind stop 384 is gradually retracted through the action of cam $1022_e$ which causes the grinding to be resumed, and when the rough grind stop has been fully retracted, the wedge piston 328 reaches the adjustable stop 360 and the carriage 256 comes to rest for final spark-out grinding.

During both the spark-out and also the wheel dressing operation, the cam $1022_l$ is operated to clamp the work carriage ways by the action of pistons 250. These clamps are retracted by the cam $1022_l$ during the intervals between these two operations.

After the time for spark-out has expired, the cam $1022_d$ projects its transmitter to deliver oil to the right end of cylinder 324 and retracts the wedge 328. Concurrently the wheel carriage 216 is retracted from the work to its extreme righthand position by the action of cams $1022_a$ and $_m$, or one of them, which project their transmitters to deliver oil to cylinder 634. Also the cam $1022_h$ withdraws its transmitter to allow return oil in cylinder 724 to swing the loader arm to a dwell position in which the work pocket 790, which is empty at the time, is in line with the work collet. Thereupon the cam $1022_l$ retracts its transmitter piston to open the collet jaws and the cam $1022_g$ projects its piston to operate the work ejector, thus causing the work piece to be transferred from the collet to the pocket 790. Next the cam $1022_h$ withdraws its transmitter piston a further distance to allow return oil to swing the loader arm into position against the stop 784 with the pocket 788 in line with the collet. Thereupon cam $1022_j$ operates its transmitter piston through a forward and return cycle to oscillate the loader lever causing the pin 796 to push the new work piece out of pocket 788 and into the collet. Next the cam $1022_l$ causes reclosing of the collet jaws and the cam $1022_h$ causes return motion of the loader arm to the dotted line position in FIGURE 19. During this motion, the cams $1022_a$ and $_m$ may advance the wheel carriage 216 into working position, thus completing a normal cycle of grinding operation.

At a suitable point in the grinding cycle, shortly after the finished work piece is ejected from the loader arm and slides down the rails 778 to the gaging station, the gaging piston 826 is moved all the way to the right by the action of cam $1022_k$, thus pushing the finished work piece onto the gage plug 844. After sufficient time has elapsed for a gaging to take place, the cam $1022_k$ retracts the piston all the way to the left causing the work piece to fall forwardly and leftwardly off from the end of short rail 836 and onto the delivery chute 846. This action occurs by reason of the shroud ring 842 which pushes the work piece ahead of it as the piston 826, rod 828, plate 832, and bar 838 move through a full stroke from the right hand extreme to the left hand extreme in FIGURE 22.

When a work piece is sufficiently large or small to be outside the limits, then the appropriate one of the dimension sensing relays 860 and 862, FIGURE 26, is closed which causes energization of the stepping motor solenoid 452 or 454, FIGURE 11, to which it is connected. Thus, referring to FIGURE 11, if the solenoid 452 be energized, the arm 424 will be swung clockwise carrying pawl 428 which drives the rotor 420. It will be understood that the starting position for this solenoid actuating stroke is adjustable by means of the screw 442 and thus the angle of rotation imparted to rotor 420 may be varied as desired. This adjustment, once determined for the particular gaging and sensing arrangement, may be left undisturbed during normal running. In this way the position of stop pin 394, which determines the upper limit stroke of the work carriage 256 is periodically reset.

Since the wheel is dressed while the carriage is in its upper position, it will be seen that the effect of having reset the stop is to cause the wheel to be dressed either slightly larger or slightly smaller than before and this compensates for whatever factor was causing the grinding of a work piece to one of the limits of size. It will be seen that this is a self-correcting feed back which tends to keep the machine grinding pieces to the sizes corresponding to the range in between the extreme gage readings.

Immediately after the work piece was delivered to the delivery chute by the gaging piston, the cam $1022_k$ returns the piston to its mid position illustrated in FIGURE 22, where the next work piece riding down the rails 778 will be retained on the rails 834 and 836 by abutment with the pusher plate 832, as shown in dotted lines at 833 in FIGURE 22.

The rotation of cam shaft 1020 takes place at three different speeds during a single revolution. The two-speed transmission within the unit 306 controls itself to shift between rapid speed and feed speed through the internally operated cam and valve mechanism, previously described. Preferably the shift from feed to rapid occurs at the conclusion of the spark-out when it is then desired to retract the wheel and reload the collet. This rapid speed is preferably maintained until all operations have been completed ready for grinding the new piece in the collet when the shift internally to feed speed is made.

When the rough grinding has been completed, the electrical cam 1024 operates limit switch LS–5C in line 27 to energize control relay CR–7 which, through its contacts in line 30 energizes the third-speed solenoid 1048. Referring to FIGURE 28, this shifts the three-way valve 1046 to admit auxiliary oil to the line 1050 and third-speed clutch 1008. Thus, the input shaft 970 is driven through the gears 998, 1000, 1002, and 1004 instead of the gears 978, 980, 982 and 984. Since the former gearing drives the shaft 970 at a higher speed than the latter, the over-running clutch 988 allows the shaft 970 to turn at the higher speed. Thus, the operation of dressing the wheel may be conducted with the cam shaft turning at a more favorable speed than either the slow feed speed or the rapid speed.

When the work carriage first moved down away from the position where grinding started, the limit switch LS–3H was opened which deenergized the dressing complete signal light and also relay CR–6. The latter had the effect of closing a preparatory circuit through the normally closed contacts in line 24 associated with relay CR–5 and used during the cycle for dressing a new wheel.

Referring now to FIGURES 6 and 28, the adjustable limit stop pin 394 for the wedge piston 328 has associated therewith a free-floating piston 402. When the stop screw 394 is retracted fully to the left, the threaded portion 396 abuts the right-hand end of piston 402 and clamps it tightly against the left end of cylinder 400. In this position the floating piston is locked out of action. However, if the stop pin 394 is advanced to the right any distance, the floating piston 402 is allowed a corresponding amount of stroke. Thus, whenever stroke is subtracted from the allowable stroke of piston 328 by the stop pin 394, a corresponding amount is added to the stroke of the floating piston 402. The cam $1022_d$, when it projects the transmitter piston, will first push the floating piston 402 to the right before any oil is delivered to the wedge piston 328, the effect being to have constant total volumetric displacement for the two pistons 402 and 328, regardless of the adjusted position of the stop pin 394.

The grinding cycles thus described are repeated until either the wheel becomes worn and limit switch LS–1H is actuated by the downward descent of the work carriage 256 or alternately by manual operation of the emergency stop switch 1064. In the former case LS–1H in line 21 energizes the reset signal and the control relay CR–3. Its normally closed contacts in line 14 deenergize relay CR–S. The cam shaft continues to turn, however, until the electrical cam 1024 actuates switch LS–6C which is the normal stopping position of the cam shaft as previously described. Thus, the normally closed contacts in line 20 are opened deenergizing relay CR–1. The latter has contacts in line 19 which open to deenergize control relay CR–2 which deenergizes, in line 29, the cam solenoid 1044. This terminates the drive of cam shaft 1020. This puts the machine in condition for resetting the work carriage, changing the wheel and starting the dressing cycle for the latter as previously described.

If the emergency stop switch 1064 is actuated during the cycle, all relays are deenergized and the five motors stopped, as well as the three solenoids in the lower part of FIGURE 29 are deenergized.

It will thus be seen that the present invention provides an improved machine tool construction wherein the size variations between successive work pieces, which are being machined, may be very small due to the minimizing of friction in the ways of the feed carriage which has no overhung load. Improved accuracy is also achieved through clamping the ways during both wheel dressing and finish grinding, as well as through the use of a wheel dresser which is located in predetermined relation to the work spindle axis.

These results are accomplished, moreover, by a fast automatic operating cycle wherein idle time required to remove and replace work pieces in operating position is reduced to a minimum. While the form of embodiment of the invention as herein disclosed constitutes a preferred form, it is to be understood that other forms might be adopted, all coming within the scope of the claims which follow.

What is claimed is as follows:

1. A machine tool for rotating both a work piece and a cutting tool comprising a main frame having one side provided with a pair of horizontal ways, a tool carriage slidable on the ways and carrying a power driven tool spindle with its axis horizontal, and projecting laterally to one side of the ways, means forming a pair of vertical ways secured to the frame at their upper and lower ends and spaced laterally from the frame beyond the tool spindle, a work carriage slidable on the vertical ways with its center of gravity adjacent the median plane of the ways, a power driven work spindle mounted on the work carriage with its axis horizontal and spaced endwise from the tool spindle, means for reciprocating the tool carriage along its ways and means for feeding the work carriage along its ways whereby a work piece mounted on the work spindle may be machined by a tool mounted on the tool spindle.

2. A machine tool for rotating both a work piece and a cutting tool comprising a main frame having one side provided with a pair of horizontal ways, a tool carriage slidable on the ways and carrying a power driven tool spindle with its axis horizontal, and projecting laterally to one side of the ways, means including a pair of hydraulic displacement elements forming a pair of vertical ways secured to the frame at their upper and lower ends and spaced laterally from the frame beyond the tool spindle, a work carriage slidable on the vertical ways with its center of gravity adjacent the median plane of the ways, a power driven work spindle mounted on the work carriage with its axis horizontal and spaced endwise from the tool spindle, means for reciprocating the tool carriage along its ways and means including a controlled source of hydraulic pressure fluid for feeding the work carriage along its ways whereby a work piece mounted on the work spindle may be machined by a tool mounted on the tool spindle.

3. A machine tool for finishing cylindrical surfaces on work pieces comprising a main frame having a horizontally extending way, a first carriage slidable on the way, a first power driven spindle mounted on the first carriage and projecting horizontally to one side of the way, means forming a vertical way secured to the frame and projecting therefrom a horizontal distance beyond the first spindle, a second carriage slidable on the vertical way and having its center of gravity close to the vertical way, a second power driven spindle mounted on the second carriage, said spindles having parallel horizontal axes, and means for reciprocating the first and second carriages along their ways to cause a tool mounted on one spindle to machine a cylindrical surface on a work piece mounted on the other spindle.

4. A machine tool for finishing cylindrical surfaces on work pieces comprising a main frame having a horizontally extending way, a first carriage slidable on the way, a first power driven spindle mounted on the first carriage and projecting horizontally to one side of the way, means forming a vertical way secured to the frame and projecting therefrom a horizontal distance beyond the first spindle, a second carriage slidable on the vertical way and having its center of gravity close to the vertical way, a second power driven spindle mounted on the second carriage, said spindles having parallel horizontal axes, and means for reciprocating the first and second carriages along their ways to cause a tool mounted on one spindle to machine a cylindrical surface on a work piece mounted on the other spindle, said tool and work piece being positioned at a distance horizontally from both ways and from the frame whereby coolant and chips may fall free thereof by gravity, and a collecting tray beneath the spindles.

5. A machine tool for finishing cylindrical surfaces on work pieces comprising a main frame having a horizontally extending way, a first carriage slidable on the way, a first power driven spindle mounted on the first carriage and projecting horizontally to one side of the way, a second carriage having a second power driven spindle thereon, means including upper and lower pairs of rams and cylinder units spaced horizontally beyond the first spindle and forming a vertical slide and connecting the second carriage to the frame for vertical travel, means for applying a substantially constant hydraulic pressure to support the weight of the second carriage and exert a preponderant upward force, and an adjustable stop mechanism for controlling the vertical movement of the second carriage.

6. A machine tool for finishing cylindrical surfaces on work pieces comprising a main frame having a horizontally extending way, a first carriage slidable on the way, a first power driven spindle mounted on the first carriage and projecting horizontally to one side of the way, means forming a vertical way secured to the frame at a horizontal distance beyond the first spindle, a second carriage slidable on the vertical way and having its center of gravity close to the vertical way, a second power driven spindle mounted on the second carriage, said spindles having parallel horizontal axes, means for oscillating the first carriage along its way, hydraulic means for urging the second carriage upwardly with a force greater than gravity, a mechanical stop for adjustably positioning the second carriage, and means for moving the stop to control the feeding movements of the second carriage.

7. A machine tool for finishing cylindrical surfaces on work pieces comprising a main frame having a horizontally extending way, a first carriage slidable on the way, a first power driven spindle mounted on the first carriage and projecting horizontally to one side of the way, means forming a vertical way secured to the frame at a horizontal distance beyond the first spindle, a second carriage slidable on the vertical way and having its center of gravity close to the vertical way, a second power driven spindle mounted on the second carriage, said spindles having parallel horizontal axes, means for oscillating the first carriage along its way, means for biasing the second carriage upwardly, an adjustable stop for limiting the upward motion of the second carriage, means operated in synchronism with the oscillation of the first carriage for moving the adjustable stop, and hydraulic clamping means for clamping the second carriage to its ways between feeding movements thereof.

8. A machine tool carriage mount comprising a generally C-shaped frame having upper and lower arms which are substantially horizontal, aligned vertical bores at the ends of the arms to form ways, a carriage having upper and lower rams projecting therefrom and slidably fitted in said bores, and means for clamping the rams in the bores.

9. A machine tool carriage mount comprising a generally C-shaped frame, having upper and lower arms which are substantially horizontal, aligned vertical bores at the ends of the arms to form ways, a carriage having upper and lower rams projecting therefrom and slidably fitted in said bores, said rams being axially approximately coincident with a plane containing the center of gravity of the carriage.

10. A machine tool carriage mount comprising a generally C-shaped frame, having upper and lower arms which are substantially horizontal, aligned vertical bores at the ends of the arms to form ways, a carriage having upper and lower rams projecting therefrom and slidably fitted in said bores and means for counterbalancing the weight of the carriage including a hydraulic pressure chamber carried by the lower arm of the frame.

11. A machine tool carriage mount comprising a generally C-shaped frame, having upper and lower arms which are substantially horizontal, aligned vertical bores at the ends of the arms to form ways, and a carriage having upper and lower rams projecting therefrom and slidably fitted in said bores.

12. A machine tool carriage mount comprising a generally C-shaped frame, having upper and lower arms which are substantially horizontal, aligned vertical bores at the ends of the arms to form ways, a carriage having upper and lower rams projecting therefrom and slidably fitted in said bores, and means for feeding the carriage along the ways including a wedge and hydraulic means for driving the wedge and a threaded abutment of variable length for varying the vertical position of the head independently of the wedge.

13. In a machine tool the combination of a frame, a carriage reciprocably mounted on the frame, means biasing the carriage in one direction, a feed mechanism for driving the carriage against the bias and for releasing it for movement with the bias comprising a feed box having a member shiftable longitudinally to move the carriage, a wedge slidable transversely to shift the member and hydraulic means for shifting the wedge between at least two terminal positions and means including a screw and nut for varying the length of the shiftable member regardless of the position of the wedge.

14. In a machine tool the combination of a frame, a carriage reciprocably mounted on the frame, means biasing the carriage in one direction, a feed mechanism for driving the carriage against the bias and for releasing it for movement with the bias comprising a feed box having a member shiftable longitudinally to move the carriage, a wedge slidable transversely to shift the member and hydraulic means for shifting the wedge between at least two terminal positions, a screw and nut for varying the length of the shiftable member, a gear connected to operate the screw and nut and a transverse shaft having a worm in engagement with the gear.

15. In a machine tool the combination of a frame, a carriage reciprocably mounted on the frame, means biasing the carriage in one direction, a feed mechanism for driving the carriage against the bias and for releasing it for movement with the bias comprising a feed box having a member shiftable longitudinally to move the carriage, a wedge slidable transversely to shift the member and hydraulic means for shifting the wedge between at least two terminal positions, a screw and nut for varying the length of the shiftable member, a gear connected to operate the screw and nut and a transverse shaft having a worm in engagement with the gear and a pair of operators for the worm shaft including a hand crank and an intermittent grip device.

16. In a machine tool having a reciprocably mounted carriage, the combination of a feed mechanism comprising a member shiftable with the carriage and forming an abutment, a hydraulic piston shiftable transversely across the abutment and having an inclined plane formed thereon for actuating the shiftable member, means forming adjustable stops for the piston at each end of the stroke thereof and a third stop for stopping the piston in an intermediate position and hydraulic means for extending the third stop selectively.

17. In a machine tool having a reciprocably mounted carriage, the combination of a feed mechanism comprising a member shiftable with the carriage and forming an abutment, a hydraulic piston shiftable transversely across the abutment and having an inclined plane formed thereon for actuating the shiftable member, a second piston slidable parallel to the first piston, rack and pinion means connecting the two pistons for conjoint motion, a pair of stops for adjustably limiting the stroke of the first piston and a third stop selectively shiftable to contact the second piston and limit the stroke of both pistons to a shorter distance.

18. In a machine tool having a shiftable carriage, an oscillator mechanism for producing two different modes of vibratory motion of the carriage comprising a rotary input shaft, a pair of swinging arms pivoted on the axis of the input shaft, a pair of cam shafts, one journalled in each arm for rotation parallel to the input shaft, means for driving the cam shafts from the input shaft, an output member connected to operate the carriage, a pair of cam followers connected with said member and each shiftable in a plane containing one of the cams, means for selectively swinging either arm into and out of position for cam and follower engagement, and means for biasing the carriage, the output member and the followers toward cam-engaging position.

19. In a machine tool having a shiftable carriage, an oscillator mechanism for producing two different modes of vibratory motion of the carriage comprising a first rotary cam and a follower therefor for producing a predetermined mode of vibration of the follower, a second rotary cam and follower for producing a different predetermined mode of vibration of the second follower, means for driving the cams, an output member connected to operate the carriage, and means for selectively rendering either cam effective to vibrate the carriage.

20. In a machine tool having a shiftable carriage, a hydraulic piston and cylinder motor connected to operate the carriage, means for biasing the carriage in one direction, a first pulsator unit hydraulically connected to operate the motor, a first cam mechanism for driving the first pulsator, a second pulsator unit connected hydraulically in parallel to the first pulsator unit to also operate the motor, cam means for operating the second pulsator unit and means for selectively rendering the second pulsator unit effective.

21. In a machine tool having a shiftable carriage, a hydraulic piston and cylinder motor connected to operate the carriage, means for biasing the carriage in one direction, a first pulsator unit hydraulically connected to operate the motor, a first cam mechanism for driving the first pulsator, and having a dwell position thereon, a second pulsator unit connected hydraulically in parallel to the first pulsator unit to also operate the motor, cam means for operating the second pulsator unit and means controlled in synchronism with the first cam means for selectively rendering the second pulsator unit effective during the dwell period of the first cam means.

22. In a machine tool having a shiftable carriage, a hydraulic piston and cylinder motor connected to operate the carriage, means for biasing the carriage in one direction, a first pulsator unit hydraulically connected to operate the motor, a first cam mechanism for driving the first pulsator, a second pulsator unit connected hydraulically in parallel to the first pulsator unit to also operate the motor, cam means for operating the second pulsator unit including a pair of selectively operable cams and means for selectively rendering the second pulsator unit effective to operate the carriage in motions determined by either one of said pair of cams.

23. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$ and means for feeding the feed carriage toward and away from the wheel by the same distance $d$ to enable the wheel to be dressed with the feed carriage located away from the work and to enable the work to be finish ground with the feed carriage advanced toward the wheel.

24. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$ and means for feeding the feed carriage toward and away from the wheel by the same distance $d$ to enable the wheel to be dressed with the feed carriage located away from the work and to enable the work to be finish ground with the feed carriage advanced toward the wheel and adjustable stop means for limiting each end of the stroke of the feed carriage.

25. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$, means for shifting the dresser holder into and out of wheel dressing position, and means for feeding the feed carriage toward and away from the wheel by the same distance $d$ to enable the wheel to be dressed with the feed carriage located away from the work and to enable the work to be finish ground with the feed carriage advanced toward the wheel.

26. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$ and means for feeding the feed carriage toward and away from the wheel by the same distance $d$ to enable the wheel to be dressed with the feed carriage located away from the work and to enable the work to be finish ground with the feed carriage advanced toward the wheel and means for feeding the feed carriage toward the wheel by an additional small increment after completion of a dressing and grinding operation to thereby cause the dresser to take additional stock from the wheel at the next dressing cycle while maintaining the same distance $d$ between the dressing and finish grinding positions of the feed carriage for the subsequently ground work piece.

27. A grinding machine for producing parts in quantity within narrow tolerances comprising a grinding wheel spindle carriage mounted for translation horizontally along the surface of the work to be finished, a feed carriage mounted for translation vertically upon ways passing substantially through the center of gravity of the feed carriage, a work holding spindle and a wheel dresser holder both mounted on the feed carriage in a predetermined positional relation with the dresser closer to the wheel than the location of the surface of the unground work and spaced from the intended location of the finished surface by a predetermined distance $d$ and means for feeding the feed carriage toward and away from the wheel by the same distance $d$ to enable the wheel to be dressed with the feed carriage located away from the work and to enable the work to be finish ground with the feed carriage advanced toward the wheel.

28. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$, means movable between limit stops for shifting the feed carriage by the distance $d$ and additional means for independently giving the feed carriage an incremental movement toward the wheel to take additional stock from the wheel at the next dressing operation.

29. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$, means for controlling the feed carriage including a first abutment for limiting the upward motion to establish the position for dressing the wheel, a second abutment for limiting the downward motion to establish the position for finish grinding, and a third abutment for stopping the carriage in an intermediate position for establishing the limit of rough grinding.

30. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$, means for controlling the feed carriage including a first abutment for limiting the upward motion to establish the position for dressing the wheel, a second abutment for limiting the downward motion to establish the position for finish grinding, and a third abutment for stopping the carriage in an intermediate position for establishing the limit of rough grinding and means for selectively rendering the third abutment inoperative whereby the second abutment may control the position of the feed carriage.

31. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$, means for controlling the feed carriage including a first abutment for limiting the upward motion to establish the position for dressing the wheel, a second abutment for limiting the downward motion to establish the position for finish grinding, and a third abutment for stopping the carriage in an intermediate position for establishing the limit of rough grinding means for gaging the size of successive finished work pieces and means connecting the gaging means to adjust the position of the first abutment whereby to correct automatically for small errors in size of finished work pieces.

32. A grinding machine for producing parts in quantity within narrow tolerances comprising a grinding wheel spindle carriage mounted for translation along the surface of the work to be finished, a feed carriage mounted for translation in a direction transverse to the path of the spindle carriage, a work holder and a wheel dresser holder both mounted on the feed carriage in a predetermined positional relation with the dresser closer to the wheel than the location of the surface of the unground work and spaced from the intended location of the finished surface by a predetermined distance $d$, means for controlling the feed carriage including a first abutment for limiting the upward motion to establish the position for dressing the wheel, a second abutment for limiting the downward motion to establish the position for finish grinding, and a third abutment for stopping the carriage in an intermediate position for establishing the limit of rough grinding, means for gaging successive finished work pieces including an electric circuit controller responsive to pieces at an upper limit of size and a circuit controller responsive to pieces at a lower limit of size and a bidirectional stepping motor responsive to said circuit controllers and connected to vary the position of the first abutment.

33. In a grinding machine having a wheel spindle carriage slidably mounted for reciprocation along the surface of work to be ground, a feed carriage shiftably mounted for feeding movements transverse to motion of the wheel carriage, a work holder and a dresser mounted on the feed carriage; the combination of a mechanico-hydraulic drive unit comprising a plurality of cams and hydraulic pulsator columns operated thereby and connected to shift the carriages and the dresser, said unit including: a cam-and-pulsator connected to control wheel carriage motion between a retracted position for work loading and advanced positions for wheel dressing and work grinding, a cam-and-pulsator connected to control feed carriage motion between a retracted position for dressing the wheel and a partially advanced position during which motion rough grinding of the work occurs, and a cam-and-pulsator connected to control feed carriage motion to a fully advanced position at which finish grinding occurs, said cams being correlated to retract the feed carriage and advance the wheel carriage for dressing the wheel after the rough grinding has occurred and prior to finish grinding.

34. In a grinding machine having a wheel spindle carriage slidably mounted for reciprocation along the surface of work to be ground, vertical ways carrying a feed carriage shiftably mounted for feeding movements transverse to motion of the wheel carriage, a work holder and a dresser mounted on the feed carriage; the combination of a mechanico-hydraulic drive unit comprising a plurality of cams and hydraulic pulsator columns operated thereby and connected to shift the carriages and the dresser, said unit including: a cam-and-pulsator connected to control wheel carriage motion between a retracted position for work loading and advanced positions for wheel dressing and work grinding, a cam-and-pulsator connected to control feed carriage motion between a retracted position for dressing the wheel and a partially advanced position during which motion rough grinding of the work occurs, and a cam-and-pulsator connected to control feed carriage motion to a fully advanced position at which finish grinding occurs, said cams being correlated to retract the feed carriage and advance the wheel carriage for dressing the wheel after the rough grinding has occurred and prior to finish grinding, means for clamping the feed carriage to the ways and a cam-and-pulsator connected to clamp the feed carriage to the ways during dressing and during finish grinding.

35. In a grinding machine having a traverse carriage and a feed carriage, a work holder, a grinding wheel spindle and frame means mounting the carriages for relative motion in a work surface traversing direction and in a work feeding direction perpendicular thereto, the combination of a cyclic actuating and control system for causing repeated cycles of work grinding motions of the carriages, a work loading and unloading mechanism operable in timed relation to the operation of the carriages, a wheel dresser associated with the work holder and shiftable into and out of a dressing position fixed with relation to the work holder, means for then causing a dressing motion of the carriages once during each grinding cycle including means for producing an increment of in-feed of the feed carriage, means for stopping the cyclic operation after a predetermined amount of in-feed and means for causing the carriages and the dresser to partake of a repeated series of wheel dressing motions prior to another series of grinding cycles whereby a newly installed grinding wheel may be automatically dressed to a predetermined starting size prior to normal grinding operation.

36. In a grinding machine having a traverse carriage and a feed carriage, a work holder, a grinding wheel spindle and frame means mounting the carriages for relative motion in a work surface traversing direction and in a work feeding direction perpendicular thereto, the combination of a cyclic actuating and control system for causing repeated cycles of work grinding motions of the carriages, a work loading and unloading mechanism operable in timed relation to the operation of the carriages, a wheel dresser associated with the work holder and shiftable into and out of a dressing position fixed with relation to the work holder, means for then causing a dressing motion of the carriages once during each grinding cycle including means for producing an increment of in-feed of the feed carriage, means for stopping the cyclic operation after a predetermined amount of in-feed and means for initiating a dressing cycle of carriage motions including a device for cyclically moving the traverse carriage in repeated traverses while the dresser is in dressing position, a device for producing increments of in-feed of the feed carriage, and means for terminating the dressing cycle after in-feed to a predetermined feed carriage position.

37. In a grinding machine having a traverse carriage and a feed carriage, a work holder, a grinding wheel spindle and frame means mounting the carriages for relative motion in a work surface traversing direction and in a work feeding direction perpendicular thereto, the combination of a cyclic actuating and control system for causing repeated cycles of work grinding motions of the carriages, a work loading and unloading mechanism operable in timed relation to the operation of the carriages, a wheel dresser associated with the work holder and shiftable into and out of a dressing position fixed with relation to the work holder, means for then causing a dressing motion of the carriages once during each grinding cycle including means for producing an increment of in-feed of the feed carriage, and means for stopping the cyclic operation after a predetermined amount of in-feed.

38. In a grinding machine having a traverse carriage and a feed carriage, a work holder, a grinding wheel spindle and frame means mounting the carriages for relative motion in a work surface traversing direction and in a work feeding direction perpendicular thereto, the combination of a cyclic actuating and control system for causing repeated cycles of work grinding motions of the carriages, a work loading and unloading mechanism operable in timed relation to the operation of the carriages, a wheel dresser associated with the work holder and shiftable into and out of a dressing position fixed with relation to the work holder, means operable in timed relation to the carriages and after a predetermined amount of in-feed for shifting the dresser to dressing position, said control system including means for thereafter initiating a cycle of finish grinding carriage motions.

39. In a feed mechanism for a machine tool carriage, the combination of an abutment member and a wedge member relatively shiftable to control the motion of the carriage, a first double ended hydraulic fluid displacement device connected to the wedge, a second double ended fluid displacement device connected to the wedge, a hydraulic power and control device connected to two ends of the motors to drive the wedge in each direction, a lubricant reservoir connected by an inlet check valve to another end of the motors, a delivery check valve also connected with said end and a passage for delivering lubricant passing through the delivery check valve to the coacting surfaces of the wedge and abutment.

40. In a feed mechanism for a machine tool carriage, the combination of an abutment member and a wedge member relatively shiftable to control the motion of the carriage, a double acting hydraulic piston carrying the wedge intermediate its ends, a second double acting hydraulic piston, rack and pinion means coupling said pistons for conjoint motion in opposite directions, means for applying hydraulic pressure selectively to one end of either piston to advance and retract the carriage, and means forming a two stage lubricant pump at the opposite ends of said pistons.

41. In hydraulic power equipment, a fluid motor including a housing and a member shiftable within said housing, said member when shifted creating with said housing a chamber having a certain volumetric capacity, a cam actuated fluid displacement pulsator for powering said motor, piping interconnecting said pulsator and said chamber, an expansible cavity communicating with said piping, and adjustable means for both limiting travel of said shiftable member and thus diminishing the capacity of said chamber and also expanding said cavity to a volume corresponding to the volume by which the capacity of said chamber is diminished.

References Cited in the file of this patent

UNITED STATES PATENTS

| | | |
|---|---|---|
| 1,603,692 | Heald et al. | Oct. 19, 1926 |
| 1,881,870 | Nenninger | Oct. 11, 1932 |
| 1,991,799 | Einstein et al. | Feb. 19, 1935 |
| 2,028,631 | Stevens | Jan. 21, 1936 |
| 2,042,257 | Harrison et al. | May 26, 1936 |
| 2,092,721 | Arter | Sept. 7, 1937 |
| 2,092,876 | Cramer | Sept. 14, 1937 |
| 2,099,674 | Bullock et al. | Nov. 23, 1937 |
| 2,241,634 | Decker | May 13, 1941 |
| 2,313,479 | Price et al. | Mar. 9, 1943 |
| 2,486,244 | Balsiger et al. | Oct. 25, 1949 |
| 2,612,008 | Kuniholm et al. | Sept. 30, 1952 |
| 2,692,457 | Bindszus | Oct. 26, 1954 |
| 2,720,228 | Traben | Oct. 11, 1955 |